May 28, 1968     T. M. HYLTIN     3,386,092
MODULAR INTEGRATED ELECTRONICS RADAR

Filed April 10, 1967     14 Sheets-Sheet 1

INVENTOR
TOM M. HYLTIN
BY *Kenneth R. Glaser*
ATTORNEY

May 28, 1968     T. M. HYLTIN     3,386,092

MODULAR INTEGRATED ELECTRONICS RADAR

Filed April 10, 1967     14 Sheets-Sheet 5

INVENTOR:
TOM M. HYLTIN

Rennoth R. Glaser

ATTORNEY

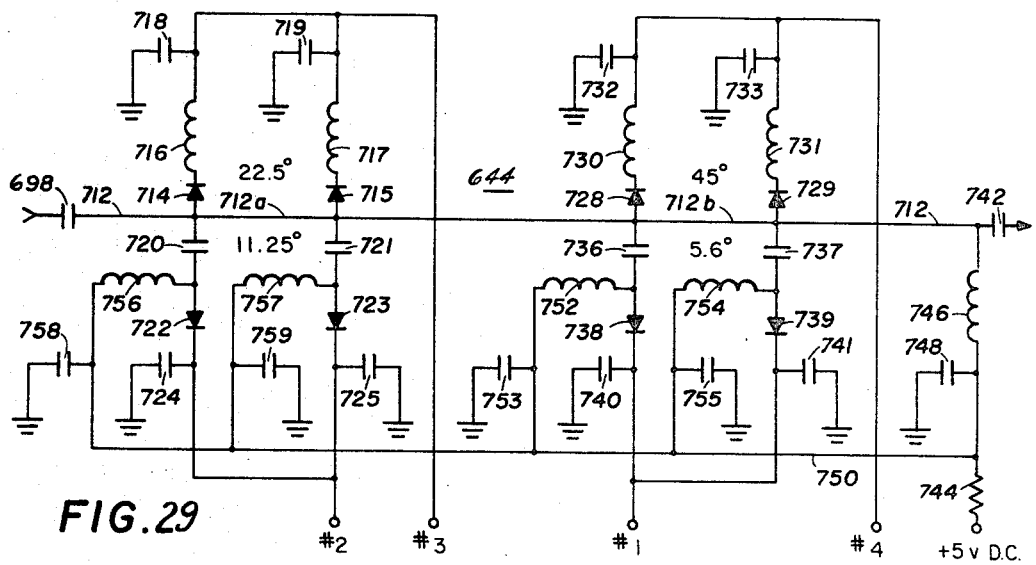
FIG.29
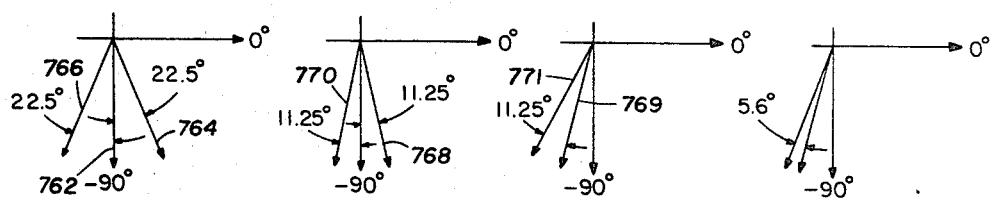
FIG.30a  FIG.30b  FIG.30c  FIG.30d
| BITS | | | | TX = φ | RX = 90°φ |
|---|---|---|---|---|---|
| 4 | 3 | 2 | 1 | | |
| 0 | 0 | 0 | 0 | 0 | 84.35 |
| 0 | 0 | 0 | 1 | 5.6 | 78.75 |
| 0 | 0 | 1 | 0 | 11.25 | 73.1 |
| 0 | 0 | 1 | 1 | 16.85 | 67.5 |
| 0 | 1 | 0 | 0 | 22.5 | 61.85 |
| 0 | 1 | 0 | 1 | 28.1 | 56.25 |
| 0 | 1 | 1 | 0 | 33.75 | 50.6 |
| 0 | 1 | 1 | 1 | 39.35 | 45.00 |
| 1 | 0 | 0 | 0 | 45.00 | 39.35 |
| 1 | 0 | 0 | 1 | 50.6 | 33.75 |
| 1 | 0 | 1 | 0 | 56.25 | 28.1 |
| 1 | 0 | 1 | 1 | 61.85 | 22.5 |
| 1 | 1 | 0 | 0 | 67.5 | 16.85 |
| 1 | 1 | 0 | 1 | 73.1 | 11.25 |
| 1 | 1 | 1 | 0 | 78.75 | 5.6 |
| 1 | 1 | 1 | 1 | 84.35 | 0 |
FIG.31
INVENTOR
TOM M. HYLTIN
ATTORNEY

United States Patent Office

3,386,092
Patented May 28, 1968

3,386,092
MODULAR INTEGRATED ELECTRONICS RADAR
Tom M. Hyltin, Dallas, Tex., assignor to Texas Instruments Incorporated, Dallas, Tex., a corporation of Delaware
Continuation-in-part of applications Ser. No. 397,519, Sept. 18, 1964, and Ser. No. 606,427, Dec. 30, 1966. This application Apr. 10, 1967, Ser. No. 629,761
23 Claims. (Cl. 343—5)

ABSTRACT OF THE DISCLOSURE

A phased array radar system including a plurality of transmit-receive modules, each including a radiation element and capable of providing power amplification, phase shifting, mixing, frequency multiplication of a transmitted and/or received signal in the module. Various components or parts of the module are described including a solid state mixer, frequency multiplier, phase shifters, power amplifier, transmit-receive switch, as well as a scan control system in conjunction with the phase shifter.

---

This application is a continuation-in-part application of copending applications S.N. 397,519, filed Sept. 18, 1964, and S.N. 606,427, filed Dec. 30, 1966, now abandoned.

This invention relates to radar utilizing solid-state modules in the transmission and reception of microwave energy, and more particularly to a modular electronic radar having a multi-element phased array antenna.

Airborne radar systems have been faced with the problems of minimizing weight while at the same time increasing reliability. Other problems have involved the generation of high power microwave energy and the associated involved signal processing and computer circuitry. For example, major problems in the reliability of the radar have arisen with the auxiliary equipment such as rotary joints, servo motors with the antennas, and the like, these reliability difficulties existing even in the most modern of all transistorized radars produced for airborne service. Further, the use of magnetrons for transmitting, klystrons for local oscillator service, and the use of high power transmit-receive (TR) protection devices all have severely restricted the reliability of the overall system.

The present invention is therefore directed to overcoming these problems and, while this invention is immediately advantageous in connection with the construction and operation of airborne radar, it also has application to other radar systems such as those used for ground mapping, search and detection, fire control, tracking, and navigation, and may be programmed to operate in any of the above modes or at several of such modes on a time sharing basis. In addition, individual sections or portions of the microwave modules may be utilized in communication systems of all types as will become readily apparent from the detailed description.

Accordingly, the present invention is directed to an improved radar system which utilizes an array of solid-state functional electronic blocks or modules so constructed as to operate as a modular antenna array which may be responsive to beam steering control and which may be operated at a desired power level and at a desired high frequency, for example at X band frequencies of say 9 gc. ($9 \times 10^9$ cycles per second). The construction of each of these modules enables the achievement of a light-weight multi-element array antenna using electronic beam scanning with the elimination of wave guides, rotary joints, motors, synchros, gears and other servo components normally essential to a scanning system. In addition to a substantial reduction in total volume and weight over known or existing radars, the radar system of the present invention is accompanied by a substantial increase in the reliability of the overall system.

Each individual antenna module of the array is capable of amplifying phase shifting, and frequency multiplying, a transmitted signal in the module prior to the application of the signal to the radiation structure of the module as well as amplifying and phase shifting the received signal in the module which is representative of the electromagnetic radiation sensed by the radiation element. Each individual antenna module with its individual power generation and phase control permits electronic beam steering.

In accordance with one specific embodiment of the present invention, the radar comprises an antenna formed of a multiplicity of modules forming a planar radiation array operated by applying a low power pulsed RF carrier coincident in time and in phase to each module. Simultaneously a low power RF phase control pulse is applied in phase to each module. The phase of the phase control pulse is shifted by phase angles dependent upon the position of each module in the array and in dependence upon a predetermined beam angle. The phase shifted low power pulse is then combined with the RF carrier pulse for production of a pulse which is amplified and applied to the antenna. Electromagnetic energy reflected to the antenna following excitation thereof produces a received signal in each module. The received signal is shifted in each module by a phase angle related to the phase shift of the phase control carrier pulse. All of the phase shifted received signals are then combined to produce output signals from the radar.

In accordance with this preferred embodiment, the phase shifted RF carrier pulses are amplified in each module to a power level exceeding that to be applied to the antenna, and are then frequency-multiplied for excitation of the antenna at a frequency substantially in excess of the frequency of the low-power pulse of the RF carrier. Phase control for the antenna excitation and for the received signal is carried out at a comparatively low power level. Power amplification and frequency multiplication are carried out in each antenna module with integrated circuit instruction which may include an integrated circuit mixer for the receive signal in each module. This embodiment includes the combination of a manifold for the supply of DC power and of comparatively low level RF carrier pulses, and an antenna array formed of the modules each coupled to the manifold. As noted each module includes radiation structure, power amplifier means for driving the radiation structure, and phase shift means for controlling the phase of the transmitted pulses and for controlling the phase of the received signals from the radiation structure.

In an another embodiment of the present invention, the phased array radar system includes a plurality of transmit-receive modules, each module having an antenna element and input and output signal channels. During the transmit cycle, an RF carrier signal, of a frequency of 2.25 gHz. for example, is passed through the input channel to a preamplifier, a duplexer switch, a binary phase shift circuit, a power amplifier, a frequency quadrupler, and a TR switch to the antenna element which then generates electromagnetic radiation of 9.0 gHz., for example, from the antenna. During the receive cycle, a signal of 2.125 gHz., for example, is applied through the input channel to the preamplifier, the duplexer switch, a binary phase shifter, a second frequency quadrupler, and is then applied as an 8.5 gHz. local oscillator injection voltage to a mixer. The received signal representative of the RF energy received by the antenna element is passed by the TR switch through the output channel to this mixer, and the output of the mixer is passed through an IF preamplifier as an IF output signal at 500 MHz., for example.

Also described is the means for production of output power at a desired increased frequency involving the use of frequency multipliers of integrated circuit construction whereby the multiplier involves a varactor in a semiconductor body with transmission lines matched to the input and output impedance of the multiplier, with idlers at selected harmonic frequencies of an input signal frequency, and with input and output filters to prevent power flow from the multiplier other than at the desired frequency.

Further, the integrated circuit multiplier provides an output of X-band frequency after power amplification. A high resistivity substrate is provided with a ground plane conductor on the bottom thereof. A conductive film overlays a portion of the top of the substrate. A thin high dielectric layer covers the conductive film. A plurality of spaced capacitor plates are formed on the dielectric layer. Conductive strips of loop form interconnect the plates and each extend beyond the margin of the conductive film to form inductances. A resonant circuit connecting one of the loops to the ground plane conductor and including the variable capacitor semiconductor diode resonant at the desired frequency in the X-band.

The integrated circuit frequency multiplier is of strip line construction with inductances and capacitances portions formed of narrow conductive strips over thick dielectric sections connected in series with wide conductive strips over thin dielectric sections where the dielectric sections are formed of a semiconductor in which at least one varactor diode is formed and is connected in shunt relation across the transmission lines.

In a further aspect, a line switching phase shift control is illustrated in which a phase control carrier pulse at a first frequency undergoes a first phase shift before mixing with an RF carrier pulse for antenna module excitation. Received signals from the module are then passed through the same phase shifting network but are at a different frequency to be shifted by a different phase angle than the phase control carrier. Frequency multiplication of the antenna excitation pulse is provided by an amount equal to the ratio of the frequencies of the phase control pulse and frequency of the received signal. Also described is a binary phase shift circuit for incorporation into the module of the invention.

For a more complete understanding of the present invention and for further objects and advantages thereof, reference may now be had to the following description taken in conjunction with the accompanying drawings in which:

FIGURE 1 diagrammatically illustrates the operation of an aircraft, its antenna array, and the functional electronic block employed to make up the array;

FIGURE 29 is an enlarged schematic circuit diagram of the transmit phase shift circuit of FIGURE 28;

FIGURES 30a–30d are phase angle diagrams which serve to illustrate the operation of the phase shift network shown in FIGURE 29; and FIGURE 31 is a truth table which serves to illustrate the operation of the counter and the two phase shift circuits of the phase shift network shown in FIGURE 28.

Figure 1:
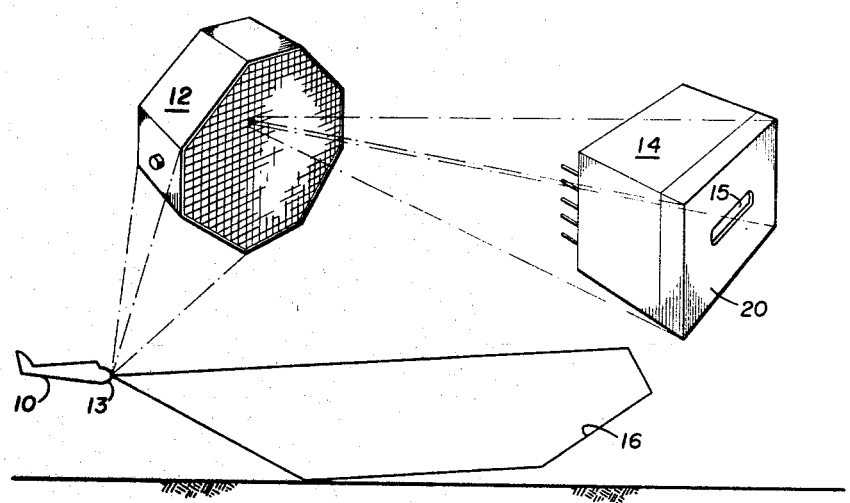

The invention will be described as it is employed in a terrain-following radar. In this system, an aircraft 10 has an antenna unit 12 mounted in the nose 13. Antenna unit 12 is comprised of a multiplicity of functional electronic blocks, such as the block 14. In the example illustrated in FIGURE 1, 448 such blocks make up an antenna array of octagonal shape. The face of each block is of the order of one inch (1″) square. Block 14 is adapted to be plugged into a suitable frame in the antenna unit 12 to transmit and receive electromagnetic energy by way of slot 15.

The video information made available by the radar is then processed to provide terrain-following capabilities. For example, in accordance with one mode of operation employed in a system known as the template system, a premaster trigger is supplied to the template generator concurrently with each transmitted pulse from the antenna unit 12 to initiate a synthetic echo. This echo or template trigger occurs at a time range that is based upon the desired clearance altitude, the characteristics of the air frame, and the scan position. The range of the template trigger changes with the scan angle. The scan angle is varied by adjusting the relative phase relationships between the microwave energy applied to each of the modules in the antenna unit 12 during one vertical scan.

The scan angle defines the template shape such as illustrated in FIGURE 1 by the outline 16. The video return or received signals are compared with the synthetic echos to obtain proportional command signals. The video return signal received before the synthetic echo signal is employed to generate climb commands. Similarly, the video return signal received after the synthetic echo generates dive commands.

Use of the present invention involves a multi-element, phased antenna array of solid-state construction capable of operation as above outlined as well as in other modes. A new and unique structural and functional relationship between integrated semiconductor circuits is employed for antenna excitation and for beam steering any of a plurality of modes.

Figure 2:
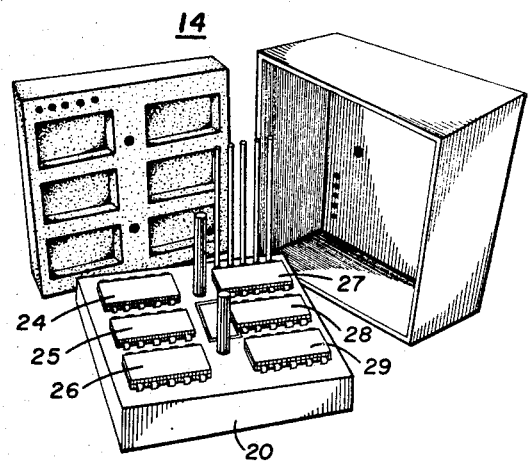
FIGURE 2 illustrates one form of a solid-state antenna module.

The modules of antenna unit 12 are of identical construction and may be of the character illustrated in FIGURES 1 and 2, where a planar face member 20 is provided with a slot 15 leading to microwave circuits which are excited by pulses of an RF carrier of X-band frequency.

Antenna module 14 is unique in that it includes its own power generation circuit and receiver preamplifier circuit and in addition has its own phase shift circuit for beam steering. Included in the block 14 are a plurality of integrated circuits 24–29 which have the same gross appearance as units manufactured and sold by Texas Instruments, Inc., of Dallas, Tex., under the trademark "Solid Circuits."

The size of the module is determined or limited by the allowable spacing between radiating elements for avoidance of spurious grating lobes.

SYSTEM BLOCK DIAGRAM

Figure 3:
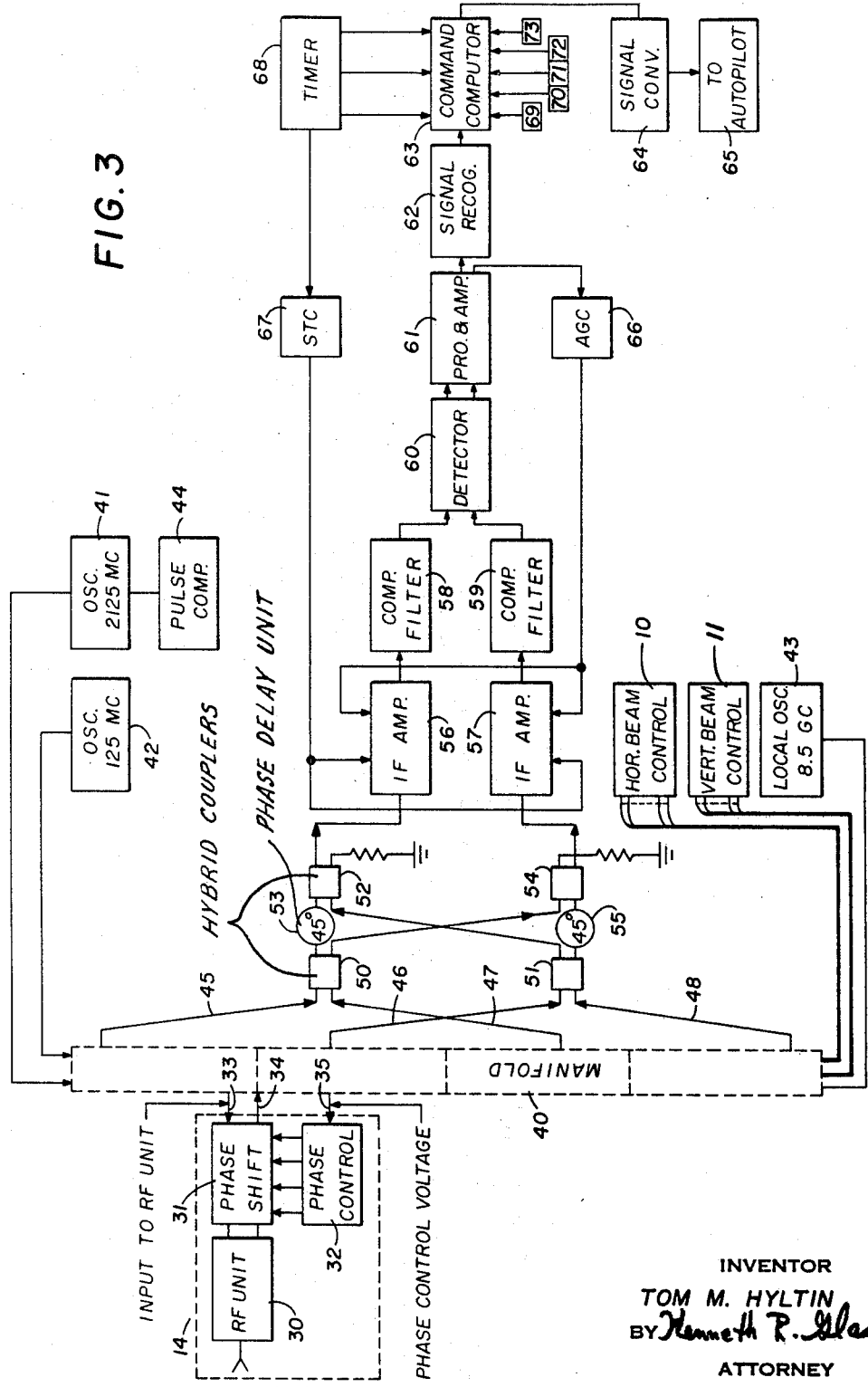
FIGURE 3 is a block diagram of the terrain-following radar of FIGURE 1.

As shown in FIGURE 3, module 14 includes an RF unit 30, a phase shift unit 31, and a control network 32. The phase shift network receives low-power RF carrier pulses by way of channel 33 and delivers output signals of IF frequency by way of channel 34. A beam steering or phase control voltage is applied to the control network 32 by way of channel 35. While only one module 14 has been shown in FIGURE 3, it is to be understood that the 448 blocks illustrated in the antenna unit 12 of FIGURE 1 will similarly be excited and controlled from a manifold 40.

A source 41 supplies a pulsed RF carrier at 2.125 gc. to manifold 40 under the control of a pulse compression generator 44. An oscillator 42 supplies a pulsed phase control carrier at 125 mc. to the manifold 40. As will hereinafter be explained, the phase control carrier is employed for introducing a selected phase shift into the RF pulse from source 41. A local oscillator 43 applies a continuous low level voltage to manifold 40 at a frequency of 8.5 gc.

Output signals at an IF frequency appear on channel 34 and are applied from module 14 to manifold 40 for processing. As indicated, the IF signals from modules in the upper quarter of the antenna unit 12 are summed and appear on output channel 45. The sum of the IF output signals from the upper center quarter of the antenna unit 12 appears on channel 46. The sum of the IF output signals from the lower center quarter of the antenna unit 12 appears on channel 47, and corresponding signals from the lower quarter of antenna unit 12 appear on output channel 48.

Channels 45 and 47 are connected to the inputs of a 3 db hybrid coupler 50. The signals on channels 46 and 48 are applied to the inputs of a coupler 51. One output from coupler 50 is applied to a coupler 52 by way of a 45° phase delay unit 53. The second input to coupler 52 is supplied by one output of coupler 51. In a similar manner, a fourth coupler 54 is supplied by way of a phase delay unit 55 and by coupler 50. The output signals from couplers 52 and 54 are applied to IF amplifiers 56 and 57, respectively, which in turn feed pulse compression filters 58 and 59. Detectors 60 are driven by output signals from filters 58 and 59 and in turn drive a monopulse resolution improvement processor and video amplifier 61. A signal recognition circuit 62 excited by unit 61 drives a command computer 63, one output of which may be applied by way of a converter 64 to an autopilot 65.

An automatic gain control (AGC) 66 excited by the output of unit 61, controls IF amplifiers 56 and 57. A sensitivity time control (STC) unit 67 also feeds IF amplifiers 56 and 57 under the control of a timer synchronizer 68. Synchronizer 68 also feeds the command computer, as do command input function generators 69–73. Generator 69 is a scan computer indicating the direction of the antenna beam. If an objective is present, then the system generates a control signal for autopilot 65. Generator 70 provides a signal representative of velocity of the aircraft. Generator 71 generates a signal representative of the actual flight vector. Generator 72 is a ride control generator, and determines whether a rough or smooth course is followed, i.e., how abruptly the aircraft will change attitude when a target or obstacle is sensed. Generator 73 generates a signal representative of the aircraft pitch angle.

In the light of the foregoing description and with a knowledge of the various modes of operation of radar, it will be recognized that exacting requirements are placed upon the elements to be included in module 14. In order to provide antenna power at the level necessary, solid-state circuits are employed with circuit configurations such that the necessary power may be supplied to the antenna and the desired versatility and control thereof are available within the capabilities of solid-state semiconductor networks.

ANTENNA MODULE CIRCUIT

Figure 4:
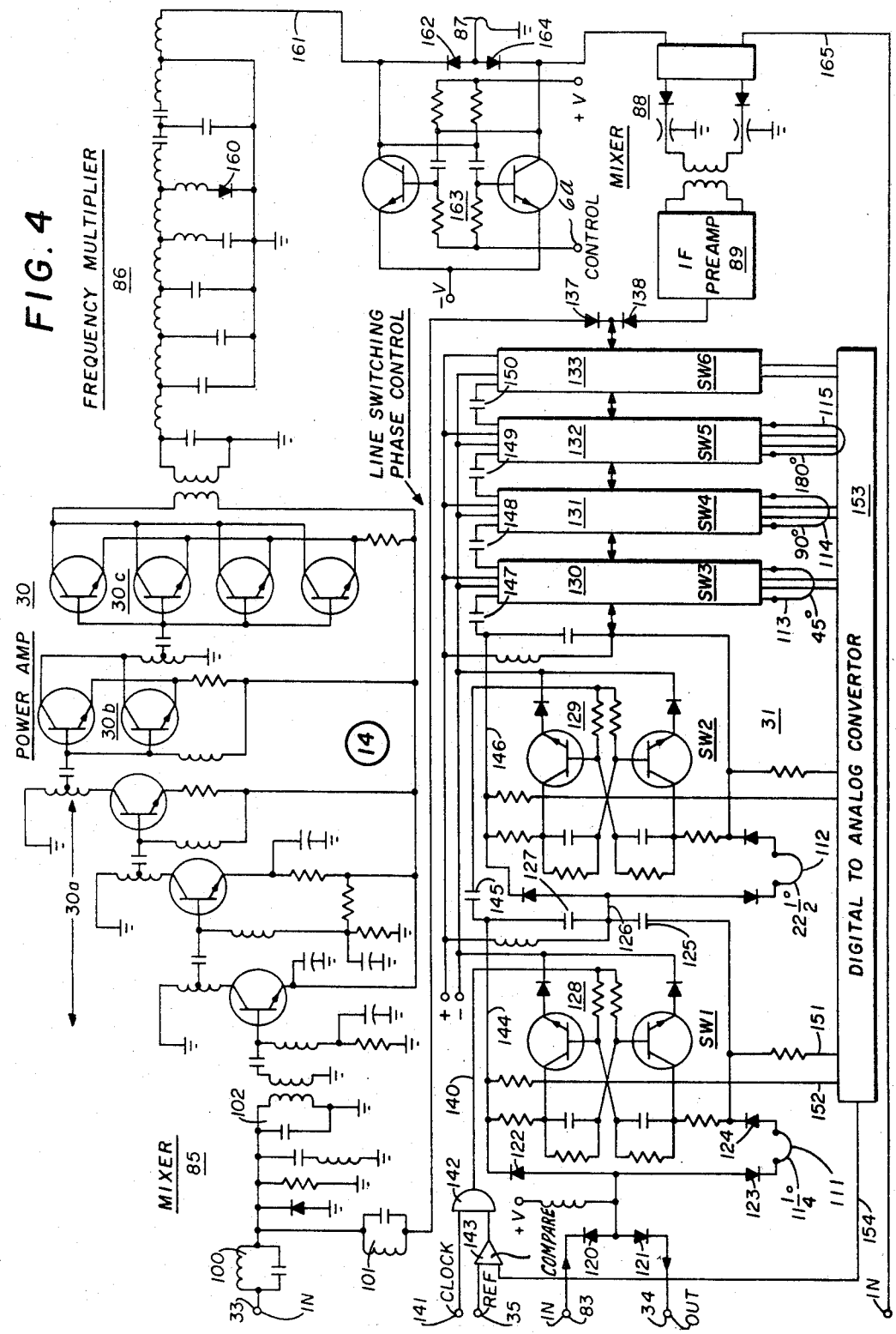
FIGURE 4 is a block diagram of the electronics in each module.

FIGURE 4 is a lumped constant representation of integrated circuits for: (a) receiving compression-modulated RF carrier pulses at a relatively low-power level from channel 33; (b) receiving phase control carrier pulses on channel 83; (c) shifting the phase of the phase control carrier in the phase shift unit 31; (d) modulating the RF pulses with the phase shifted pulses in the mixer 85; (e) amplifying one of the modulation products in the power amplifier 30; (f) stepping up the frequency of the high power signal in the frequency multiplier 86; (g) applying the final output pulses to an antenna 87; (h) detecting return signals to the antenna 87; (i) mixing the same in a mixer 88 at the input of a preamplifier 89; and (j) passing the detected signals from amplifier 89 through the phase shift unit 31 for delivery to an output channel 34.

For the purpose of the present example, the operation will be such that the RF pulses applied to channel 33 will be at a frequency of 2.125 gc., ±0.625 mc., the swing of 1.25 mc. being from low frequency to high frequency by pulse compression generator control of the oscillator 41 as shown in FIGURE 3. The phase control carrier applied to terminal 83 will be at 125 mc. The signal applied to the antenna 87 will be 9 gc. and the output signal on channel 34 will be at 500 mc. The module delivers one watt peak power to the antenna 87 at 9 gc.

The compression-modulated RF carrier pulses applied to the channel 33 pass through a tuned filter 100 at the input of the mixer 85. A second tuned filter 101 is located in the output channel leading from the phase shift unit 31 and is tuned to 125 mc. for modulating the 2.125 gc. carrier pulse. The output circuit 102 is then tuned to the upper side band or 2.250 gc. for driving the power amplifier 30. The phase shifting unit 31 is employed to control the phase of the carrier at the output tuned circuit 102.

PHASE SHIFTING BY LINE LENGTH SWITCHING

Beam scanning is provided for the antenna made up of a plurality of modules 14. As shown in FIGURE 4, beam scanning is produced by switching discrete lengths of transmission line into the antenna feed system and more particularly into the channel through which the 125 mc. phase control carrier is transmitted. This is a step-type phase shifter. The size of the smallest step is important in determining the complexity of the control circuit. In the unit 31, five transmission lines are employed and are of such length as to provide phase delay units 111–115 of 11¼°, 22½°, 45°, 90°, and 180° delays, respectively, at a frequency of 500 mc. The 125 mc. signal applied to terminal 83 will undergo delays one-fourth of the amounts noted.

The phase shifter and switching unit 31 includes diodes 120 and 121 forming an input switch. The common juncture between diodes 120 and 121 is connected to diode switches 122 and 123. Delay line 111 is connected to diode 123 and thence, by way of diode 124 and condenser 125, to the input channel 126 leading to the second stage of the phase shifter 31. The diode 122 is connected by way of condenser 127 to channel 126. The switches 122, 123, and 124 are selectively biased under the control of a bistable multivibrator 128. A second multivibrator 129 controls transmission through, or the bypass channel for, the second delay line 112. Multivibrators 130, 131, and 132 similarly control inclusion or deletion of lines 113, 114, and 115, respectively, from the transmission channel for the 125 mc. phase control carrier. A sixth multivibrator 133 is connected to the output of multivibrator 132 and in turn feeds a TR switch comprised of diodes 137 and 138.

The switch control line 140 leading to the multivibrator is supplied from a clock input channel 141 at 1 mc. by way of an AND gate 142. The second terminal of the AND gate is fed by voltage comparator unit 143. The line 144 of multivibrator 128 is connected by way of condenser 145 to the input line 146 of multivibrator 129. Similarly, condensers 147–150 connect multivibrators 129–133 in a ripple-through configuration. From zero phase delay, the first clock pulse actuates multivibrator switch unit 128 to include line 111 in the 125 mc. circuit. The second clock pulse actuates units 128 and 129 to remove line 111 and to include line 112. The third pulse actuates unit 128 to include line 111 with line 112. The fourth pulse actuates units 128, 129, and 130 to remove lines 111 and 112 and to include line 113. Thus, a digital progression is employed in increasing the delay in the delay line unit.

The multivibrator 128 is coupled by way of lines 151 and 152 to a digital-to-analog converter 153. Similarly, all of the other multivibrators are coupled to the digital-to-analog converter so that the state of the switching networks is indicated by an analog signal in the output line 154. Switch unit 133, while introducing no delay, applies current to converter 153 proportional to 360° phase delay so that the line switching sequence may continue through two cycles or 720°. The output signal from converter 153 is applied to the second input of the voltage comparator 143.

In operation, a reference voltage representative of the desired phase delay for module 14 is applied to the input terminal 35. So long as the reference voltage exceeds the output from the converter 153, the output from the comparator 143 enables the AND gate 142. With the AND gate 142 conductive, the clock pulses from terminal 141 successively shift conduction between the various flip-flops. When the output of the converter 153 equals the reference voltage on channel 35, the AND gate 142 discontinues transmission of the clock pulses and the desired delay is then fixed in the phase shift unit 31. Thereafter, the simultaneous application of the compressed RF carrier pulse and the phase control carrier pulse to terminals 33 and 83, respectively, will produce a pulse of 2.25 gc. at the output of the tuned circuit 102 in the mixer 85. The phase of the 2.250 gc. signal at circuit 102 is equal to the phase delay in the unit 31.

The signal from mixer 85 is then applied to the power amplifier 30 for delivery of about two watts peak power at 2.25 gc. to the input of the frequency multiplier 86. The multiplier 86 consists of resonant circuits in which a diode 160 is the active element. The multiplier is a quadrupler for delivery to the output channel 161 of a pulse whose frequency is 9 gc. at a peak power level of about one watt. The latter pulse is applied by way of a TR switch diode 162 to the antenna 87 for radiation at the phase set by the phase delay unit 31.

Immediately after pulse transmission from the antenna, the control multivibrator 163 for the TR switch 162, 164 changes state so that return signals detected by the antenna 87 pass through TR switch diode 164 to the input to a mixer 88. The mixer 88 is supplied with an 8.5 gc. local oscillator signal on channel 165. The lower side band modulation product at 500 mc. is applied to the IF preamplifier 89. The latter signal then passes through the switch diode 138 and the phase shift unit 31 where the signal undergoes a delay of four times the delay of the phase control carrier. This is with the same delay unit setting as employed during the transmit operation. The delay IF signal then passes through the output switch diode 121 to the output channel 34 leading to the manifold. While not shown, control units for TR switch 120, 121 and TR switch 137, 138 will provide bias voltages therefor in the same manner as the bias is supplied TR switch 162, 164.

More particularly, it will be recalled that the phase control carrier applied to terminal 83 was at a frequency of 125 mc., and that it passed through the phase shift unit 31 to control the phase of the RF pulse applied to the antenna 87. Since the multiplier 86 quadruples the frequency, the phase shift introduced by the unit 31 is also quadrupled in the antenna drive signal as it appears on channel 161. Thus, with the output of the IF preamplifier 89 at 500 mc., the output signal on channel 34 will have exactly the same phase shift as introduced into the antenna drive pulse. Thus, the same phase shift unit is used for both the transmit and the receive cycle and the beam direction is the same for receiving as for transmitting.

With power amplifier 30 present, module 14 includes its own power generation means and thus operates on low level signals from the manifold. The circuit 30 raises the power level by about 20 db in the preamplifier section 30a, about 6 db in the driver 30b, and about 4 db in the output section 30c. By way of example, the power applied to the input of the preamplifier would be about 2 milliwatts (mw.) peak or 0.2 mw. average power. The signal at the input to the driver 30b would be at about 200 mw. peak or 20 mw. average. The power applied to the output stage would be about 800 mw. peak or 80 mw. average. The power output from the output stage would be about 2 watts peak or 0.2 watt average power. In accordance with the construction hereinafter to be described, the multiplier would operate to increase the frequency from 2.25 gc. to 9 gc. with an insertion loss of 3 db to provide one watt peak power to the antenna 87. Thus, the power generation chain consists of 3 or 4 amplifier stages at 2.25 gc. followed by an X4 varactor multiplier with an output at 9 gc.

MIXER

In the system illustrated in FIGURE 4, as in other microwave systems where a high-frequency, low-level return signal is employed, the quality of the receiver largely determines the other system parameters. For operations at frequencies transmitted by antenna element 87, the noise level of the mixer 88 presents the principal problem and the mixer comprises a critical and principal component of the receiver portion of FIGURE 4.

Mixer 88 converts the received signal to a lower frequency preferably with a minimum of added noise. To optimize the noise level for the receiver, both the signalto-noise ratio of the mixer and the conversion loss in the mixer must be as low as possible. The detected signal from diode 164 and a local oscillator output signal on line 165 of FIGURE 4 are applied to a semiconductor junction and the difference as IF output signal is extracted.

For operation at frequencies in the X-band, the mixers illustrated in FIGURES 5–12 may be employed. Operation thereof is characterized by low loss, employing high ratio couplers of integrated circuit form.

Figure 5:
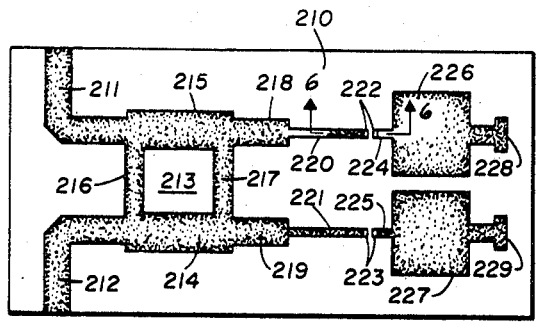
FIGURE 5 is a top view of a solid-state mixer circuit of FIGURE 4 comprising a surface-oriented diode, a strip transmission line, and a coupler.

More particularly, as shown in FIGURE 5, a semiconductor wafer 210 is provided with a signal input strip 211 and a local oscillator input strip 212. Strips 211 and 212 are metallized regions overlaying a high resistivity semiconductor wafer. The metallized regions 211 and 212 lead to the input portions of a hybrid coupler 213. The coupled 213 is provided with parallel sections 214 and 215 which are about one-quarter wavelength long and are of a width substantially greater than the width of the strips 211 and 212. Two shunt strips 216 and 217 are spaced approximately one-quarter wavelength apart and extend between sections 214 and 215. Output lines 218 and 219 extend from the coupler 213.

A pair of quarter-wave transformer sections 220 and 221 extend from the output strips 218 and 219, respectively, and make contact with terminals of surface-oriented diodes 222 and 223, respectively. Output conductors 224 and 225 lead from the other terminals of diodes 222 and 223 to output capacitors 226 and 227 to provide an output signal at output terminals 228 and 229.

With strip-line transmission lines overlaying the semiconductor wafer 210 and with surface-oriented diodes of a construction hereinafter described, a signal in the X-band may be converted to IF with about a 5 db loss. For example, a 9 gc. signal may be applied to strip 211. A local oscillator signal at 8.5 gc. may be applied to the input strip 212. As a result, an IF signal of 500 mc. is produced at terminals 228 and 229.

Figure 6:
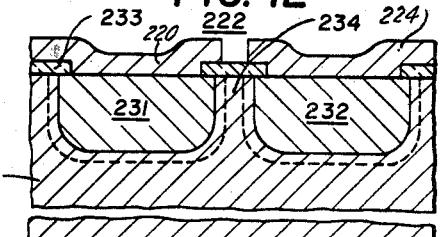
FIGURE 6 is a sectional view taken along line 6—6 of FIGURE 5 illustrating a planar alloy, surface-oriented diode.

The surface-oriented diode 222 is illustrated in one form in FIGURE 6. The wafer 210, of intrinsic silicon, is provided with a ground plane conductive layer 230. The intrinsic silicon forms a high resistivity zone above the ground plane layer 230. An N-type alloyed region 231 and a P-type alloyed region 232 are formed in the surface of the wafer 210 opposite the ground plane layer 230. A silicon dioxide insulating layer 233 is formed over the upper surface of wafer 210 to cover the surface emergence of the junctions forming the boundaries between the P-type and N-type alloyed sections and the intrinsic wafer 210. An N-type metal alloy strip 220 is then formed on the surface of the wafer 210 so as to make electrical contact with the N-type region 231. A P-type metal alloy strip 224 is formed on the surface to make electrical contact with the P-type region 232. The P-type and N-type metal alloy strips 220 and 224 are evaporated onto the surface through holes in oxide masks defined by photolithographic techniques. The metal alloy strips are then alloyed into the silicon to produce the N+ and P+ regions between the strips and the N-type and P-type regions 231 and 232. An intrinsic region 234 is disposed between the N and P regions, the boundary junctions of which are shown in dotted outline.

Such fabrication of the surface-oriented mixer diode is in a form compatible with the integrated circuit construction. The diode is a substantial improvement over conventional microwave mixer elements. Previous mixer diodes have been of the point contact variety in order to maintain low junction capacitance. The present construction has achieved junction capacitances of 0.05 picofarad (pf.) or less. When biased by rectification of the local oscillator signal to obtain the best noise figure, the shunt resistance of the junction of the present invention is approximately 400 ohms. In ordinary mixer diode configuration, this value of resistance is transformed to an input impedance of about 50 to 100 ohms by the package inductance and the junction capacitance. In the present case, the junction diameter of the diode is approximately 0.1 mil (0.0001 inch). Production of a semiconductor junction of this size, as above noted, employs intrinsic silicon having side-by-side alloy zones to form confronting edge junctions that will give the surface diode effect.

The material required for the integrated circuit preferably will provide a suitable substrate for microwave strip transmission lines and for forming the mixer semiconductor junctions. Intrinsic silicon and high resistivity gallium arsenide may be employed for mixer diodes, whereas germanium has characteristics which are not suitable for both the microwave strip transmission line and the diode construction. Where extremely low loss transmission lines are required, low loss dielectrics with deposited silver conductors are employed. Yttrium-iron-garnet (YIG) substrates may also be employed for this purpose.

Figure 7:
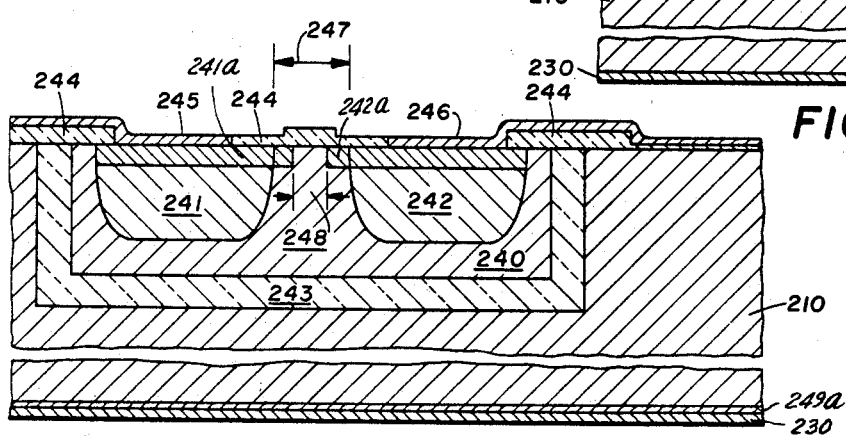
FIGURE 7 is a modified form of surface-oriented diode in which diffusion techniques are employed.

FIGURE 7 illustrates a modified form of surface-oriented diode wherein side-by-side diffusions of opposite-conductivity type impurities are formed on the upper surface of an intrinsic silicon wafer 240. The N-type diffused zone 241a and the P-type diffused zone 242a are characterized by an edge junction that will give the surface diode effect. The zones 241a and 242a are formed partially in N+ and P+ diffusion zones 241 and 242, respectively, which in turn are formed in an insulated island of intrinsic silicon about 1 mil wide and 5 mils long formed in the wafer by a insulating layer 243 of silicon dioxide.

The spacing between the edges of the diffused N+ and P+ zones 241 and 242 is about 0.3 mil in zone 247. However, the zone 248 between the confronting junctions of the N and P zones 241a and 242a is about 0.1 mil wide. The capacitance of the junction is defined by the effective junction area of the shallow diffusions and the reverse breakdown by the shallow diffused spacing and the intrinsic or I-layer concentration. Conductivity modulation under forward current conditions is minimized by reason of the effective increase injection area of the anode of the deep P+ diffusion. The problem is in defining the I-layer between the diffusion fronts so that a sufficient current density can be obtained at reasonable current levels. For currents of 20 milliamps, about a 4 square mil area will give a current density of 200 amps per square centimeter required for conductivity modulation. An insulating layer 244 covers the surface of the wafer except for metallized contact zones 245 and 246.

Surface-oriented diodes of the type illustrated in FIGURES 6 and 7 may be employed in the mixer of FIGURE 5. Where additional current-carrying capacity is required of surface-oriented diodes, as in the transmit-receive switches employed in various systems, the construction such as shown in FIGURE 8 may be employed.

Figure 8:
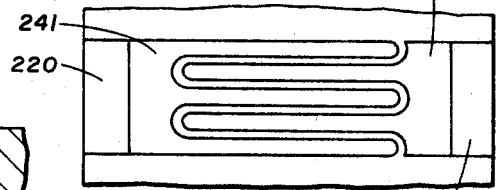
FIGURE 8 is a highly enlarged top view of the surface-oriented diode.

In FIGURE 8, the transmission lines 220 and 224 are shown contacting the diffused zones 241 and 242, respectively. The diffused zone 241 has three fingers. The zone 242 has two fingers with the fingers being enmeshed or interdigitated to provide a junction of high current-carrying capability. Such a construction exhibits low junction capacitance under moderate reversed-bias conditions and low loss.

Intrinsic silicon as the substrate material for the diodes provides insulation isolation for any number of components deposited upon it and also provides a low loss structure. The structure is readily adaptable to receiving strip transmission lines deposited directly onto the silicon. In accordance with one mode of fabrication, a ground plane conductor is evaporated onto the bottom of an intrinsic silicon substrate of approximately 5 mils thickness. Silicon dioxide on the top is etched to expose the silicon where transmission lines are required. Gold is then evaporated over the entire surface and selectively removed to leave gold over the exposed regions of the silicon. Preferably, in order to maintain the propagation properties of the lines, the alloying of gold with silicon will be avoided, as by the forming of a thin layer, a few microns thick, of a material such as molybdenum between the gold strips and the silicon.

As an alternative mode of fabrication, a hot substrate evaporation of gold onto the intrinsic silicon is carried out. The gold is then etched away to leave the transmission lines where required. At microwave frequencies, the degradation of leakage current due to the introduction of the gold into the silicon is of little consequence. In the same manner, aluminum strip transmission lines may be formed on gallium arsenide to form the transmission line pattern on a given substrate. Thus, the mixer of FIGURE 2 is a flat, integrated circuit package. The integrated circuit may be part of more complex circuits formed on the same or interconnected substrates.

Figure 9:
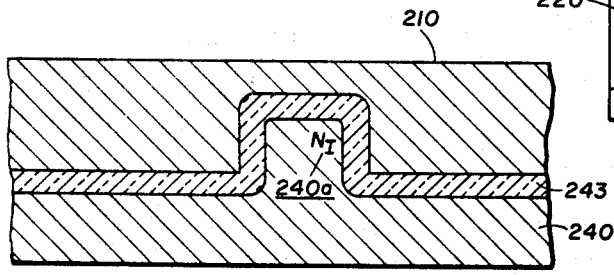
FIGURE 9 illustrates preliminary steps in forming the diode of FIGURE 7.
Figure 10:
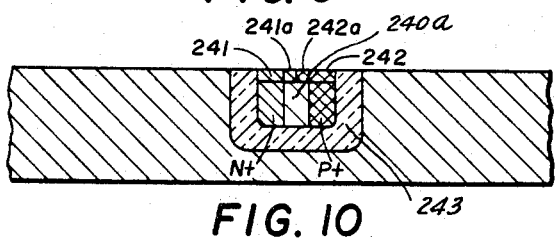
FIGURE 10 illustrates further processing steps in forming the diode of FIGURE 7.
Figure 11:
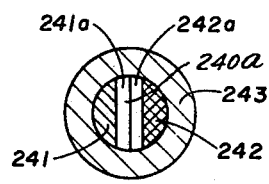
FIGURE 11 is a top view of the diode structure of FIGURE 10.

Referring again to FIGURE 7, a diffused, a surface-oriented diode with insulation isolation represents a preferred embodiment of the invention. One procedure for forming this structure is shown in FIGURES 9–11. The structure illustrated in FIGURES 9–11 is similar to the structure illustrated in FIGURE 7, and corresponding parts will therefore be designated by corresponding reference numerals. However, the structure of FIGURES 9–11 is illustrated as round, while the structure of FIGURE 7 is rectangular. The surface of a single crystal, high-resistivity substrate of N-type material is etched on the surface to form a mesa 240a on the top surface. The oxide layer 243 is then grown over the upper surface of the etched wafer and over the mesa 240a to form an insulating layer over the entire etched surface. The material forming the bulk substrate 210 of the structure in FIGURE 7 is then deposited or grown over the top of the slice 240 to completely cover the insulation layer 243 and to surround the insulation covered mesa. After the bulk material 210 is grown onto the top of the wafer, the top (in FIGURE 9) of the bulk material 210 is lapped smooth for receiving the ground plane conducting layer 230 shown in FIGURE 7.

The substrate 240 is then lapped so that all of the original wafer is removed except for the mesa which is then the island 240a located in a well or depression surrounded by the isolation layer of silicon oxide 243 as shown in FIGURE 10. Thereafter as shown in FIGURE 11, through a photomasking technique, N+ and P+ diffusions are made to form the zones 241 and 242 of opposite-conductivity types in the island 240a.

Inside the island there is then high enough impurity concentration for good low resistivity ohmic contact. The low resistivity (high concentration) diffusions have a very narrow intrinsic zone between them, of the order of 0.3 mil wide. Into this area of original material, there are made two very shallow diffusions 241a and 242a of N and P-type materials, respectively. The diffusions are very shallow (3 lines or 3 x 0.016 mil) with high concentrations. The junction between the N and P shallow diffusion zones 241a and 242a is not or need not be accurately positioned as long as it is within the 0.3 mil strip. The junction between the two zones is 1 mil wide and 3 lines deep or an area of 1 x 3 x 0.016 mil=0.048. sq. mil. This results in a very low capacitance junction suitable for use in the mixer of FIGURE 5. Contacts 245 and 246 are readily applied to the two N+ and P+ regions of FIGURES 10 and 11 to be used for bonding or pressure contacts alloyed in.

Where the diode is to be employed in the mixer application, the separation 248, FIGURE 7, between the junctions will be reduced to zero. The boundaries of the two zones will thus be contiguous. Surface-oriented diodes for use in switching applications will be constructed with separation between the two zones and for high current capability, will be interdigitated as shown in FIGURE 8.

In FIGURE 7, transmission lines 245 and 246 extend along the top of the insulating layer 244 and contact with the zones 241 and 242, respectively. Preferably, the transmission line leading to and from the surface-oriented diode, except for the insulation over the junctions as shown in FIGURE 7, will be formed directly on the surface of the semiconductor material 210. Preferably, ground plane conductor 230 and the low resistance conductive strips 245 and 246 are gold and overlay an extremely thin film of a metal such as molybdenum, as above noted, or of vanadium, platinum, nickel or tungsten evaporated to a thickness of a few microns to form an underlayer for each strip. The underlayer having a high eutectic temperature will prevent the formation of lossy zones that would otherwise be present where gold strips to be formed directly onto the silicon surface and then subjected to treatment at temperatures wherein the silicon would become intermixed with the gold at the boundary thereof. Such zones are avoided by the use of the thin film 249. The ground plane layer 230 is shown as having been formed over a film 249a on the bottom surface of the structure as shown in FIGURE 7 where the film 249a would be of materials the same as film 249.

Thus, for switching use, the diode junctions are spaced apart to form a PN diode junction. For mixer use, the confronting portions of the junctions are contiguous or overlap to form a PN diode junction. In the latter case, the boundary of the last diffused zone would define the diode junction.

Figure 12:
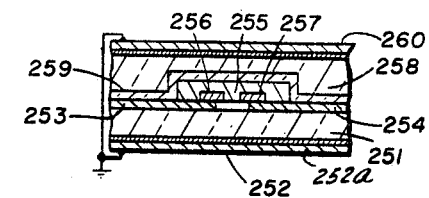
FIGURE 12 is a modified mixer construction employing a surface-oriented diode wafer and ceramic substrate.

In FIGURES 6–11, surface-oriented diodes are formed in a semiconductor substrate and thus involve a single basic building material. In FIGURE 12, a modified form of mixer construction has been illustrated. In this embodiment, a relatively thick high dielectric ceramic layer 251 has a ground plane conductive layer 252 on the bottom face thereof with a thin high eutectic metallic layer 252a thereunder. The strip-line conductors 253 and 254 are formed on the upper face of the ceramic substrate 251. A surface-oriented diode 255 having diffused P and N-type zones 256 and 257 respectively formed therein is then employed in a sandwich construction to form a diode which corresponds with the diode 222 of FIGURE 5. The diode 255 is formed in a thin wafer or chip of semiconductor material and then placed face down onto the ends of the stripline conductors 253 and 254. An isolated insulation layer 259 is then formed over the top of the ceramic substrate 251 to encompass the diode 255. A glass evaporate layer 258 is then deposited on top of the insulated layer 259. A high eutectic metal layer with a ground plane surface conductive layer 260 is then formed on top of the layer 258. A conductor serves to connect the ground plane layers 252 and 260 together for forming a shielded sandwich construction for the mixer transmission line elements and the surface-oriented diode.

FREQUENCY MULTIPLIER

Figure 13:
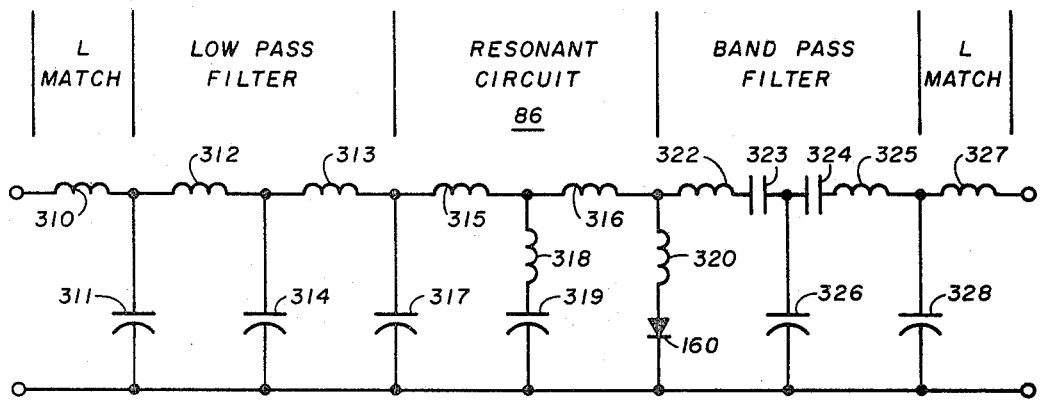
FIGURE 13 is a lumped constant diagram of the multiplier circuit of FIGURE 4.

The frequency multiplier 86 of FIGURE 4 has been further illustrated in a lumped constant equivalent form in FIGURE 13. The L matching section includes a series inductance 310 and a shunt capacitance 311. A low pass filter comprised of series inductances 312 and 313 and shunt capacitance 314 provides a low pass filter tuned to 2.25 gc. The resonant circuit which includes the active element is comprised of series inductances 315 and 316. A shunt capacitance 317 is connected to the juncture between inductances 313 and 315. A series resonant shunt circuit comprised of inductance 318 and capacitance 319 is connected to the juncture between inductances 315 and 316. A shunt circuit comprised of an inductance 320 and a diode 321 is connected to the juncture between inductance 316 and the series inductance 322 forming a part of the output band pass filter. The band pass filter includes series inductance 322, capacitance 323, capacitance 324, and series inductance 325. Shunt capacitance 326 is connected to the juncture between capacitances 323 and 324. The output L matching section includes series inductance 327 and a shunt capacitance 328.

Figure 14:
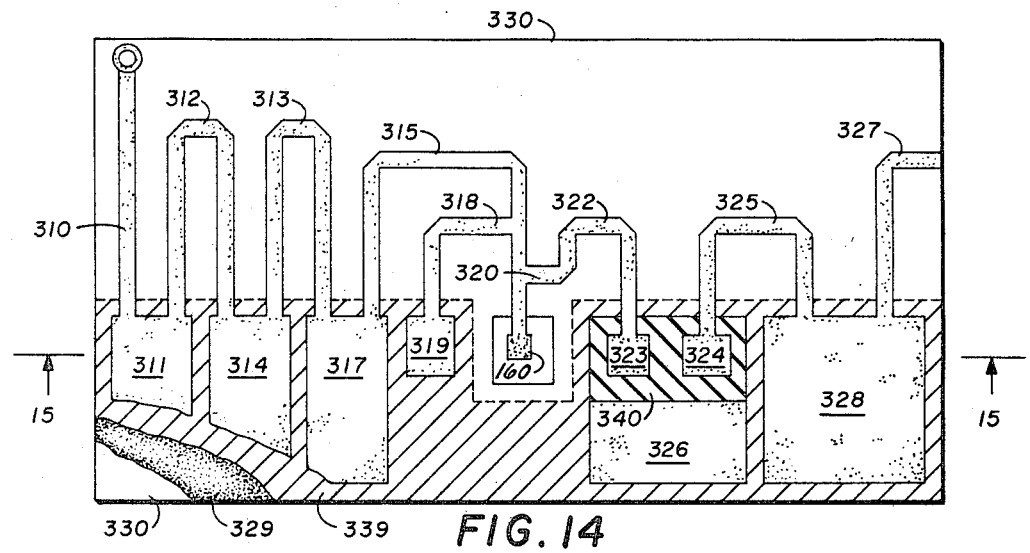
FIGURE 14 is a top view of an integrated circuit embodiment of the multiplier of FIGURE 13.
Figure 15:
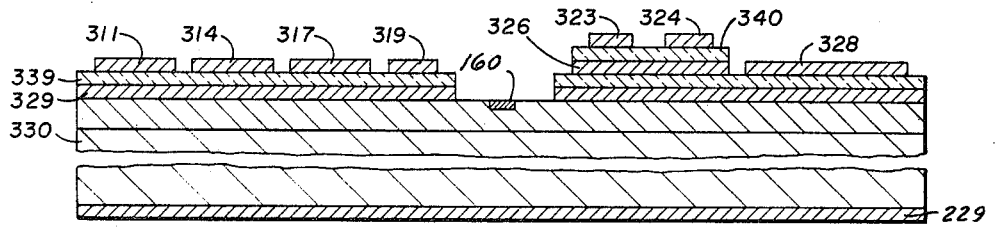
FIGURE 15 is a sectional view taken along lines 15—15 of FIGURE 14.

The formation of the multiplier in one integrated circuit configuration is shown in FIGURES 14 and 15. Prior art systems generally are limited as to power level at frequencies such as encountered in the X-band because of the small geometry necessary for operation. For example, over 25 watts power output is available from a single transistor at frequencies as high as 100 mc. For amplifiers utilizing one transistor per stage at 1000 mc., about 200 milliwatts are available and at 3000 mc., this is reduced to about 10 milliwatts. The large power capabilities at lower frequencies and efficient frequency multiplication are combined in the system shown in FIGURES 14 and 15 to obtain the necessary power at high frequencies. By this means, peak power output capability of integrated microwave sources of about 1 watt can be obtained at frequencies well above 8 gc.

The multiplier shown in FIGURES 14 and 15 employs a varactor diode 321 operating as a quadrupler with idlers at second and third harmonics. More particularly, the tuned circuit 318 and 319 may be considered to be resonant at the second harmonic and the tuned circuit 320 and 321 at the third harmonic. Because of integrated circuit construction, rather than lumped constant construction, there is contribution to the several resonance conditions from most or all of the elements in the unit since isolation of any one element is not possible as in lumped constant circuit construction. Therefore the description as to resonant circuits is in terms of result with a construction shown in FIGURE 14. The circuit will change the frequency from an input frequency of 2.25 gc. to an output frequency of 9 gc.

As shown in FIGUREES 14 and 15, the varactor diode and the strip-line transmission circuits forming inductance and capacitance are formed on a semiconductor substrate. The substrate 330 has about one-half of its area covered by a highly conductive surface layer 329. The layer 329 is then covered by a thin dielectric layer 339 so that layer 329 serves as a common plate for all but two condensers in the multiplier.

The input L section is formed by the strip transmission line 310 which extends over the thick dielectric portion of the substrate 330 to the plate 311 of the input capacitor. The capacitor 311 overlays the relatively thin dielectric layer 339 to form a condenser with the common conductive layer 329. The loop 312 forms an inductance over the thick dielectric layer and leads to a capacitor plate 314 over the thin dielectric layer. Similarly the loop 313 leads to the capacitor plate 317. The transmission line filter system will thus be characterized by long thin transmission lines over thick dielectric sections to provide primarily inductance characteristics. Wide transmission line sections overlaying thin high dielectric layers form zones in the transmission line system primarily capacitive in nature. The loop 315 extends from plate 317 over the thick dielectric to the juncture with a loop 318 which leads to a capacitor plate 319. Loop 315 also leads to one terminal of the varactor diode 321. A strip extending from the juncture 320 and loop 322 then leads to a capacitor plate 323. The capacitor plate 323 is positioned on top of a conductive layer 340 which overlays one-half of the condenser plate 326. Condenser plate 324 similarly overlays the plate 326. The transmission line loop 325 then extends to the output capacitance plate 328 with the matching inductance 327 extending from the plate 328. The plate 326 is capacitively coupled to the capacitor plates 323 and 324 and to the high conductive layer 329.

For frequencies within the range of from 0.5 to 5 gc., input and output impedance will be on the order of from 10 to 50 ohms. Capacitance values will be within the range of from 5 to 75 picofarads (pf.) ($10^{-12}$ farads) and inductances between 0.5 and 10 nanohenries (nh.) ($10^{-9}$ henries).

Since relatively high Q capacitances are necessary for operation of the multiplier circuit, and extremely thin, high dielectric constant layer 339 is employed. The inductances have low loss and high effective inductance per unit length. Thus, in the planar construction of FIGURES 11 and 12 large spacing between thin conductive loops on the upper surface of the slice 330 and the ground plane conductor form inductances. In contrast, the wide conductive layers 339 and 340 over a thin high dielectric layer form capacitances. Preferably the substrate 330 will have a dielectric constant of the order of from 4 to 12 and a thickness of from 0.005 to 0.010 inch. The layers 339 and 340 will have a dielectric constant of about 40 to 50 and a thickness of 0.0001 inch.

The filters at the input and output of the multiplier form traps to prevent power flow from the multiplier other than at the desired frequency. At the same time, the dissipation of power in the varactor is held at a minimum while maintaining the necessary band width of the multiplier. A significant band width is required due to both the characteristics inherent in the operation of the non-linear reactance or diode 321, and the undesired variations in temperature of the semiconductor junction capacitance. The multiplier band width must be sufficient to allow buildup of voltage amplitude across the diode junction, and thus develop bias voltage to bring the multiplier into proper operating range.

The dielectric requirements for both the capacitors and inductors thus may be fulfilled on the common substrate or slice 330. Diode fabrication techniques indicated in FIGURE 16 may be followed.

In step (a), N-type material is epitaxially deposited onto an N+ gallium arsenide slice. After the slice is polished, a thin film of silicon dioxide is reactively sputtered onto the surface to a thickness of approximately 6000 Angstroms. The wafer 330 with the N-type epitaxial layer 331 and the silicon dioxide surface layer 332 are shown in step (a).

By a photomasking technique, a hole 333 is then cut in the layer 332 as shown in step (b). The slice is then sealed in a quartz ampoule with $ZnAs_2$ and is diffused for about two minutes at 900° C. The result is shown in step (c) with the diffusion of zinc 334 through the hole 333 being accomplished. The depth of the diffusion is of the order of about 0.3 mil. In addition to the diffusion through the hole 333, the zinc also diffuses through the layer 332 to form a thin P layer under the oxide. The oxide layer is then removed as shown in step (d). As shown in step (e), the slice is treated with a sulphuric acid etch to remove the thin P layer outside the regions defined by the hole 333. At this point, a new oxide layer 335 is sputtered onto the slice as indicated in step (f). By photomasking and selectively etching, the oxide layer 335 is removed over the zone occupied by the zinc diffusion 334, as indicated in step (g). A transmission line strip is then evaporated onto the slice and alloyed with the gallium arsenide to form the contact 336, as shown in step (h).

After the formation of the varactor junction, the upper half of the wafer 330 is masked and a conductor is alloyed to the lower unmasked portion to form layer 329. The masking is then removed and a 1 mil thick dielectric is deposited to form layer 339. Upon this substrate, conductors shown in FIGURE 14 are incorporated by photolithographic masking techniques. Gallium arsenide and intrinsic silicon are preferred as substrate materials. A yttrium-iron-garnet substrate may be employed for the multiplier network. Gold may be employed on silicon and aluminum on gallium arsenide as the conductive materials.

Figure 17:
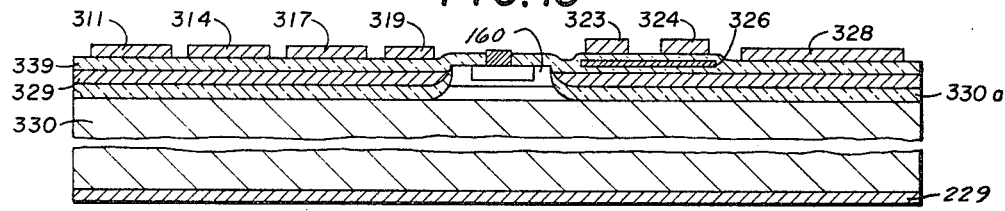
FIGURE 17 is a sectional view of a multiplier in which a mesa diode is employed.

While a planar construction is shown in FIGURE 15, it will be recognized that other modes of fabrication may be employed for providing the multiplier network on the semiconductor substrate. In FIGURE 17 a mesa-type construction is shown in which a mesa is first formed on the substrate 330 to provide a site for the diode 321. An insulating layer 330a is then formed on the surface of the substrate 330 extending up along the slopes of the mesa for insulating the junction therein.

Thereafter, the conductive layer 329 will be formed over a portion of the surface of the substrate for forming the common plate for condensers 311, 314, 317, 319, 326 and 328. The thin layer 339 of high dielectric material is then formed over the conductive layer 329. Thereafter, the condenser plates and the strip line loops will be incorporated in the circuit configuration shown in FIGURE 14.

Figure 18:
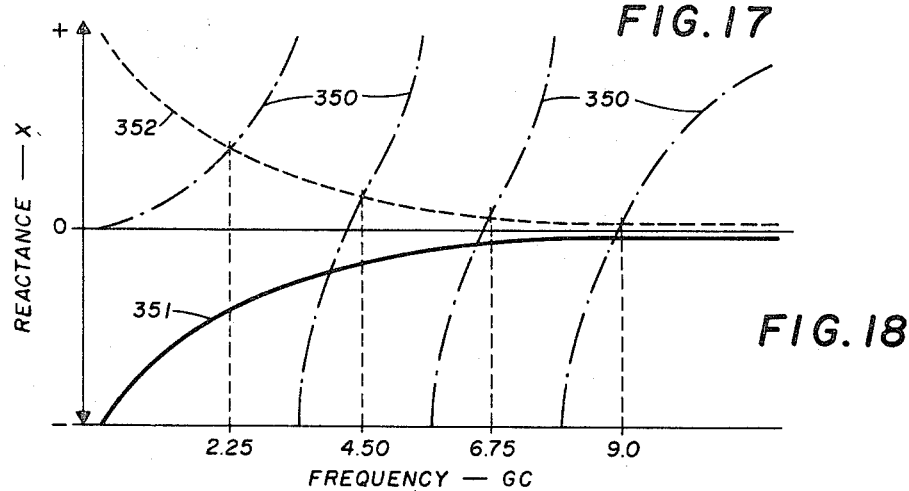
FIGURE 18 is a reactance vs. frequency diagram for the multiplier circuit.

The parameters in the construction illustrated in FIGURES 14–17, in general, are distributed constants. Resonances will be present within the system, such as illustrated in the graph shown in FIGURE 18. Reactances in the resonant circuits are plotted as a function of frequency. The impedance of the circuit, as viewed from the terminals of the varactor 321, is illustrated by the dotted lines 350. The reactance of the varactor diode 321 is plotted as the solid curve 351. The dotted curve 352 is the reciprocal of curve 351.

Figure 16:
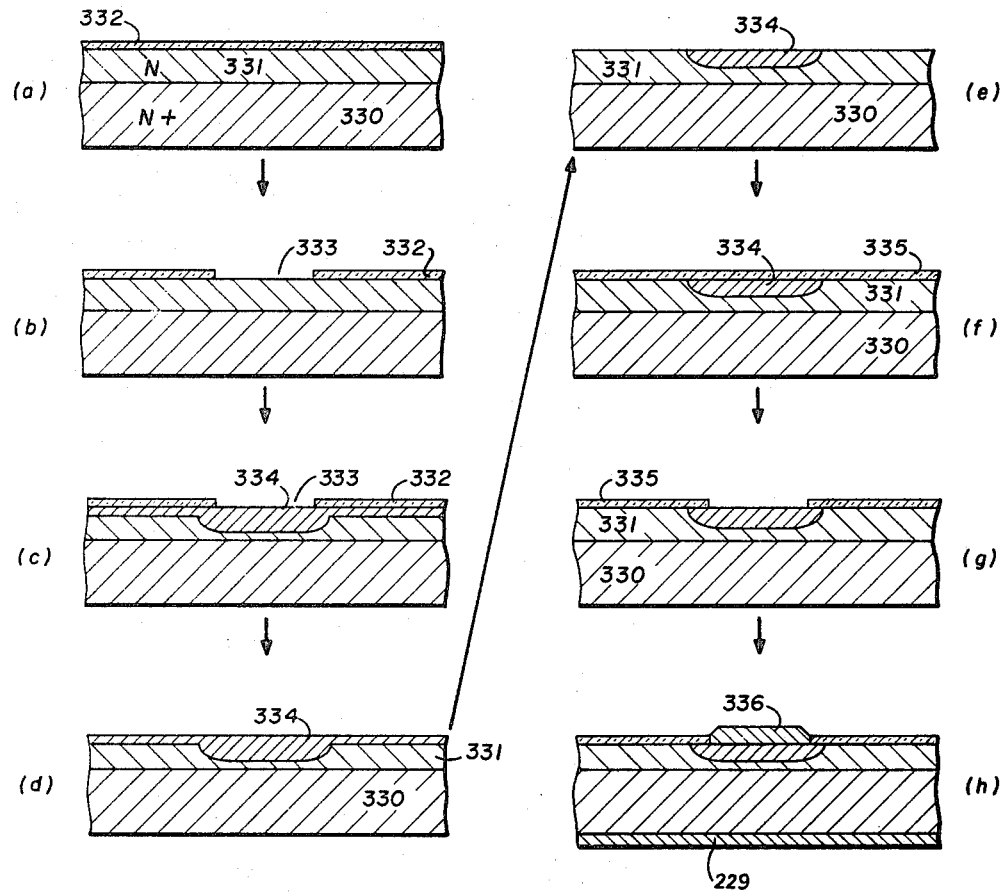
FIGURE 16 is an enlarged view of the fabrication sequence of the diode of FIGURE 14 in planar form.

The circuit construction of FIGURE 14, as further detailed in FIGURES 15–17, operates such that the intersection of the reciprocal curve 352 and the reactance curve 351 occurs at the input frequency of 2.25 gc. and at the harmonic frequencies of 4.50, 6.75 and 9.0 gc., respectively.

Figure 19:
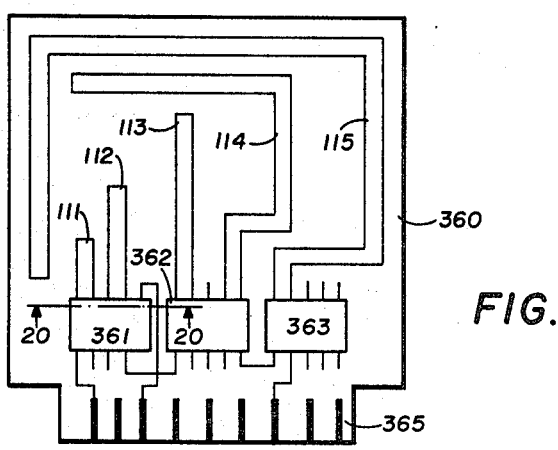
FIGURE 19 illustrates a phase shift delay strip-line panel.

While FIGURE 2 illustrates an array of integrated circuits in the antenna module 14, one form of construction of the phase shift delay line is shown in FIGURE 19. The delay line plate 360 has three integrated circuit modules 361, 362 and 363 mounted thereon. Such a wafer may be included in the package shown in FIGURE 2.

The first module 361 may include the switches SW1 and SW2 of FIGURE 4. The module 362 will include the switches SW3 and SW4 and the module 363 will include switches SW5 and SW6. The delay lines 111–115 are formed on the plate 360 with the line length being progressively longer as by factors of 2, from one line to another. Plate 360 is provided with input transmission line terminals on the tab 365 for transmission to and from the plate 360 of the phase control carrier and the received signal voltages as well as the clock pulses.

With integrated circuits 361–363 of form illustrated, the wafer 360 may be relatively small with maximum dimensions of the order of about an inch.

Figure 20:
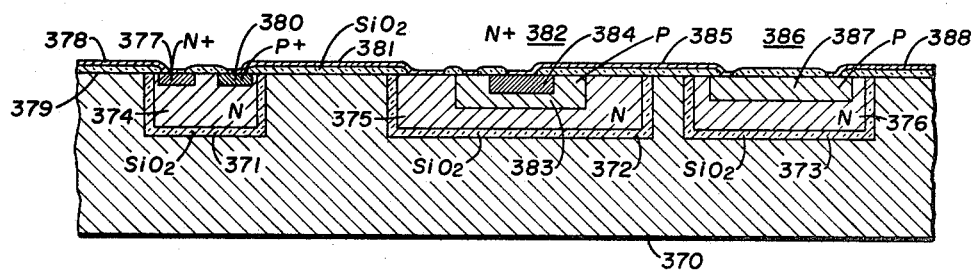
FIGURE 20 is a sectional view of the integrated circuit of one unit of FIGURE 19 taken along lines 20—20.

FIGURE 20 is illustrative of the construction of the integrated circuit wafer for the switching networks. The substrate 370 is of polycrystalline silicon. Insulation isolation cups 371, 372, and 373 surround and isolate islands 374, 375, and 376 of N-type material. The surface-oriented diode formed in the island 374 may be of the type illustrated in FIGURE 7 and will serve as either the transmit diode 122 or the receive diode 123 of FIGURE 4. A diffused N+ zone 377 is connected to a strip conductor 378 which is formed over a surface insulation 379. A diffused P+ zone 380 is then connected by conductor 381 to the emitter terminal of transistor 382.

A transistor 382 is formed of the N zone 375, P zone 383, and N+ collector zone 384. A conductor 385 connects the collector of the transistor 382 to a resistor 386, the resistor being formed by a P-type diffusion zone 387 in the N-type island 376. Lead 388 is connected to the resistor 386 and extends to other circuit elements.

With construction of the type illustrated in FIGURES 19 and 20, the phase shift delay lines and the control networks in integrated circuit form may be included in module 14. At some frequencies and for some applications, it will be desirable to construct phase shift modules separate from the radiation module 14. Such phase shift modules may be formed as shown in FIGURE 19 and would be connected in the antenna circuit between the manifold 40 and the radiation module 14.

IF PREAMPLIFIER

The IF preamplifier of FIGURE 4 is of integrated circuit construction and has a gain of about 50 db. Such high-gain integrated circuit amplifiers operating at frequencies in the range from 200 mc. to the low gc.'s, are subject to oscillation as a result of electromagnetically-coupled feedback within the integrated circuit package. This is primarily due to the very close spacing between the active and passive components formed integral with the semiconductor substrate.

Figure 21:
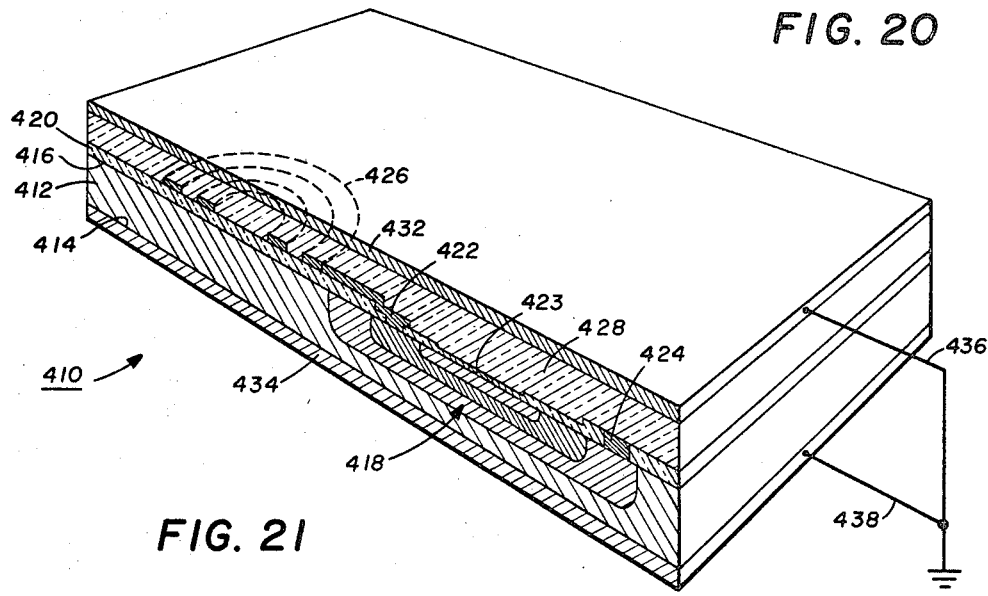
FIGURE 21 illustrates video amplifier construction for the IF preamplifier of FIGURE 4.

FIGURE 21 illustrates an integrated circuit 410 of construction suitable for the IF amplifier 89 of FIGURE 4. The circuit 410 is comprised of a substrate 412 of single crystal, high resistivity silicon or other semi-insulating or high-resistance semiconductor material having first and second surfaces 414 and 416. The resistance required between the surfaces 414 and 416 will vary with the frequency at which the circuit is operated, the lower the frequency the greater the resistance required. However, for higher frequency applications, high resistivity semiconductor material is adequate. The components for the IF amplifier are formed at the surface of the semiconductor substrate 412 using any conventional technique. For example, a transistor 418 may be formed in the surface by sequentially diffusing N-type, P-type and N-type regions into the surface 416 of the substrate through openings etched in an oxide film 420. Alternatively the components may be formed on the surface of the substrate by epitaxial techniques. The circuit may also include interconnecting strip conductors such as 422, 423, and 424 which may be placed directly on the high resistivity substrate 412 or on the oxide film 420. The conductors may also form inductors such as indicated by the dotted outline at 426.

An insulating layer 428 is deposited over and adherently bonded to the portion of the second surface of the substrate 412 which is exposed and to the components of the circuit and is therefore integral with the substrate. Metallized films 432 and 434 are adherently bonded to the insulating layer 428 and to the first side 414 of the substrate. When the metallized films 432 and 434 are connected to ground, as represented by the conductors 436 and 438, the entire integrated circuit is disposed between two closely-spaced ground planes. As a result of the closely-spaced ground planes, the electromagnetic radiation from any particular component is attenuated by a loss factor of $$\text{Loss} = k\left(\frac{d}{2s}\right)db$$

wherein $k$ is dependent upon the dielectric constant of the material between the components and the respective ground planes, $d$ is the distance from the point at which the electromagnetic wave is generated, and $s$ is the spacing between the ground planes. Although the attenuation increases as the spacing between the ground plane decreases, the insulating layer 428 should be at least 1.0 mil thick and is preferably from 3–5 mils in thickness. It will be desirable to envelop the entire circuit structure, including the substrate and insulating layer, in the metallized ground plane.

In FIGURE 21 the insulating layer 428 is glass. The glass is selected so as to have a coefficient of thermal expansion closely matching that of the substrate so as to provide thermal-mechanical stability. Further, for stabilizing the high-frequency transmission lines, the insulating layer 428 is preferably about the same thickness as the substrate 412 so that the dielectric constant between the circuit components and each of the ground planes will be approximately equal. However, the insulating layer 428 may be any material which may be adherently bonded to the substrate 412, which is chemically compatible with the substrate and active components at various temperatures, and which has a thermal coefficient of expansion compatible with that of the substrate 412 so that the substrate will not be placed under stress due to temperature changes, and may be of any desired thickness, usually thin for amplifier application and relatively thick for transmission line application. The dielectric constant may be very closely matched by making the insulating layer 428 from high-resistivity semiconductor material of the same type as the substrate 412. This can be accomplished by epitaxial growth, if a single crystal is desired for part of an active component, or by another process where a polycrystalline structure will suffice. The substrate 412 should be relatively thin, for amplifier applications where it is desired to place the ground planes as close to the active components as practical, and will usually be less than about ten mils in thickness.

As an alternate structure, the substrate 412 may be a doped semiconductor material rather than intrinsic silicon or semi-insulating semiconductor material. In such case an insulating layer is provided between the metallized film 434 and the substrate so that the ground plane formed by the film 434 will be electrically insulated from the components of the circuit. Such an insulating layer may be any suitable material such as silicon dioxide, aluminum trioxide, glass, or the like, but is preferably glass. The device 410 is particularly suited for lower frequency applications where the dielectric constant should be higher.

An IF amplifier or the like is fabricated on and in the surface of the substrate 412 using any conventional technique as heretofore described. Then the glass insulating layer 428 is formed by applying a liquid in which a high concentration of very fine glass particles is suspended. The glass particles are allowed to settle from the liquid and deposit as a sediment on the surface of the substrate and over the components of the circuit. The sedimentation process tends to uniformly deposit the glass particles over the components of the circuit and produce an essentially planar surface. Then the substrate is heated to a temperature sufficiently high to fuse the glass particles into a solid mass which adherently bonds to the exposed portion of the substrate, the oxide insulating film 420, if any, or the components of the circuit, as the case may be.

Although the insulating layer 428 was identified as glass applied by means of the liquid suspension technique, the insulating layer 428 may also be formed from glass or quartz which is evaporated in a high vacuum and condensed on the surface of the substrate. The metallized films 432 and 434 may then be deposited by a conventional evaporation and condensation process.

The exposed surfaces of the substrate and insulating films are then metallized, preferably by evaporating and condensing a metal onto the surfaces, or by other well-known techniques. Gold, aluminum or other suitable metal may be used for this purpose. However, if gold is to be deposited directly on a silicon substrate, a thin layer, a few angstroms thick, of molybdenum or other metal which does not dope the silicon is preferably deposited on the surface 414 before the gold is deposited to prevent doping of the silicon by the gold.

The integrated amplifier circuit is disposed between a pair of closely-spaced ground planes. The ground planes and the circuit are interconnected so as to provide a rugged, sealed package. For high frequency transmission lines, the dielectric properties between the circuit components and each of the ground planes may be made approximately equal for improved performance.

BEAM STEERING REFERENCE VOLTAGE GENERATION

Figure 22:
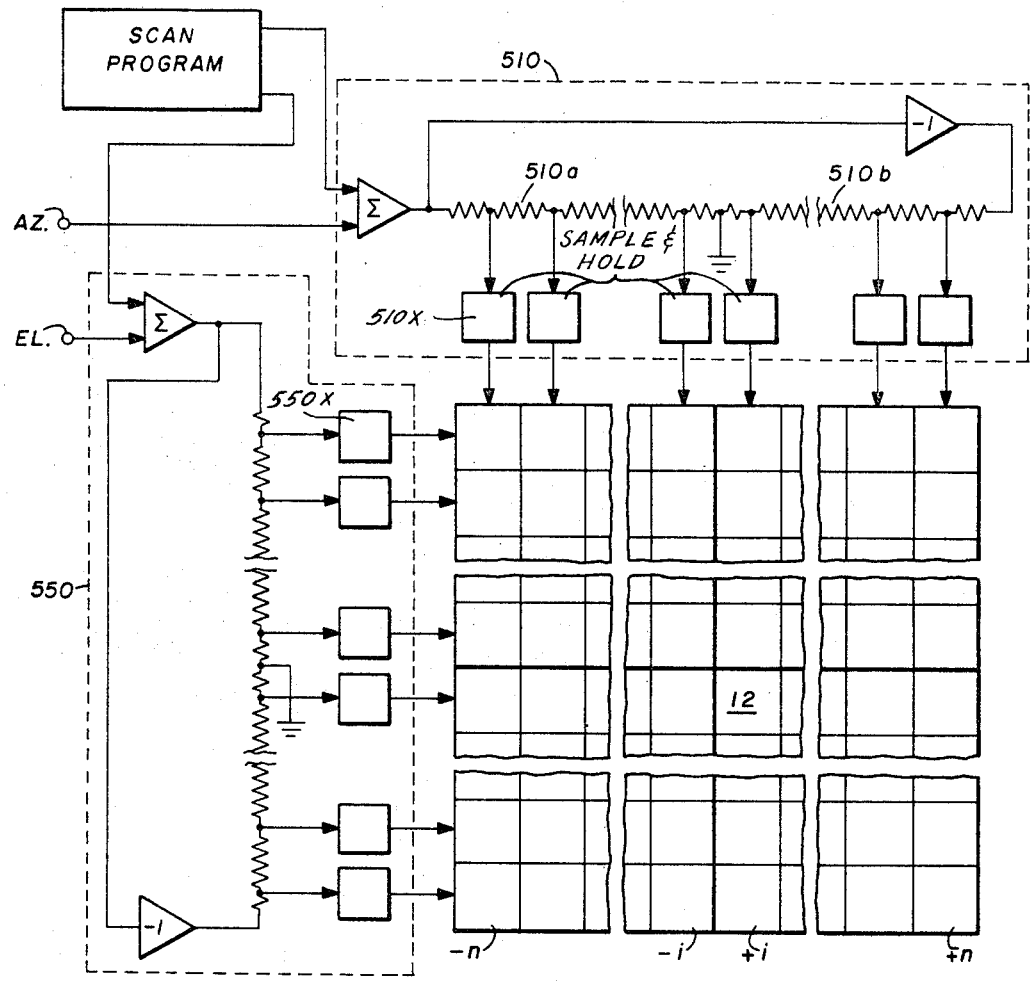
FIGURE 22 is a schematic diagram illustrating distribution of reference voltages to the antenna modules.
Figure 23:
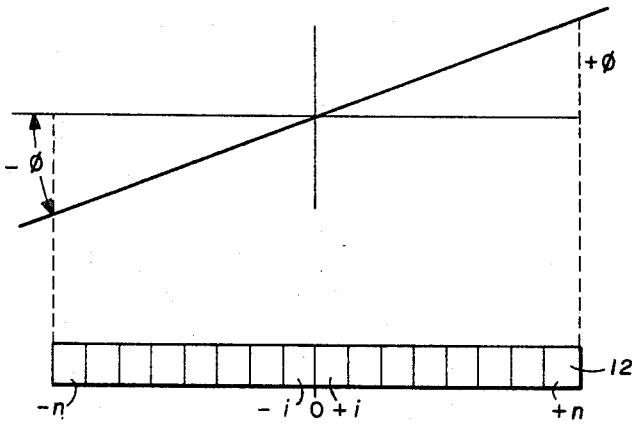
FIGURE 23 is a top view of antenna 12 illustrating beam-scanning.

The present invention is directed to a control system for generating families of reference voltages such as the voltage applied to terminal 35, FIGURE 4, in each module.

Where the antenna is made up of an array of elements arranged in rows and columns as shown in FIGURE 22, each of the rows and columns may be numbered for convenience according to their position in the array. To shift the beam of the antenna in a horizontal direction through an angle $\phi$, FIGURE 23, the phase of the RF energy applied to the radiation structure in each module in each column must be shifted by an amount which is proportional to the angle $\phi$, the angle that the beam is to be shifted from a line perpendicular from the face of the antenna. The phase shift for each module must also be dependent upon the location of the module in the array. FIGURE 23 shows a top view of the antenna unit 12 and a plot of the phase shift versus distance from the center of the antenna.

As shown in FIGURE 22, the control unit 510 generates a reference voltage which shifts the phase for the column $-n$ at the left edge of antenna 12 through the same phase angle. As represented by the tapped resistor 510a in unit 510, the voltages applied by way of sample and hold units 510X to the columns of the antenna. Sample and hold units 550X apply voltages to the rows of antenna modules. Voltages are applied to the columns in the right antenna half are the same for each column but are graded from a maximum at the edge column to near zero at the center column. The left antenna half columns similarly are controlled by reference voltages such as might be derived from resistor 510b. The unit 550 similarly serves to control the vertical scan or beam position. To point the beam in a direction involving both the horizontal and vertical deflection, the reference voltage for a given antenna element is the sum of the voltage required for the column in which a given element is positioned and the voltage required for the row in which the given element is located. Thus, as illustrated in FIGURE 23, the column at the left side of the antenna unit 12 would be delayed by an angle $-\phi$. The column at the right edge of the antenna unit 12 would be delayed by an angle of $+\phi$.

Where the antenna array is one wavelength wide and where the difference between the angle $-\phi$ and $+\phi$ is 360°, the antenna radiation primarily will be at 45° to the face of the antenna. In practice, however, the antenna generally is made many wavelengths wide and many wavelengths high so that narrow beams may be produced. When this is done, it is necessary to produce phase shifts across the face of the antenna which are equal to $H2\pi$ radians. The factor N may be any integral number with practical values ranging as high as 10 to 15 or more for phase shifts of around 5000° across the antenna.

Figure 24:
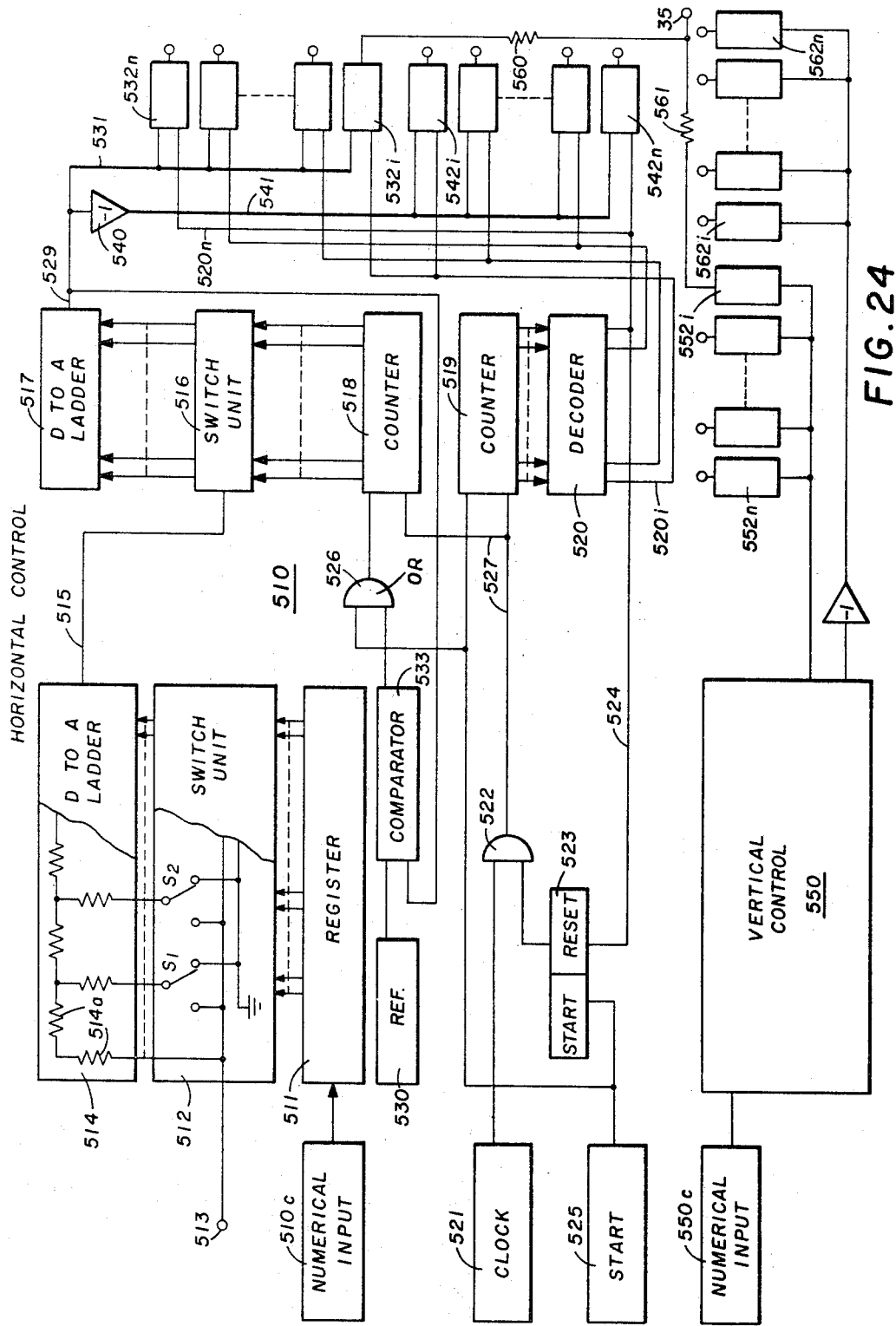
FIGURE 24 illustrates generation of reference voltages for the antenna modules.

In FIGURE 24 the controller for generating the horizontal and vertical reference voltages above noted is shown, with the controller for producing the horizontal reference voltages being shown in detail.

In order to point the beam in a given direction, a binary number, proportional to the phase shift required for the edge column n, FIGURE 23, is read into an input register 511 of unit 510 from a control source 510c. The register 511 is connected to a switch unit 512. A reference voltage is applied to the switch 512 by way of input channel 513. The digital-to-analog converter of FIGURE 24, may include switch unit 512 which may be the same as in FIGURE 4 which shows the construction of the switch units SW1–SW6 and the connections to the ladder network. The register 511 may be composed of flip-flops as shown in FIGURE 4 or may comprise other binary storage elements. These elements control switches in unit 512 which in turn control the binary weighted resistance ladder of the type commonly used in digital-to-analog converters. Typical of the construction is the resistance network illustrated in the unit 514. The resistance values are chosen so that the voltage at the output is ½ $k$ the value of the reference voltage on terminal 513 and $k$ is the number of switches in the ladder. When switch S2 is closed to the reference voltage and all the other switches are connected to ground, the output voltage is ½ $k-1$ times the reference voltage, etc. This assumes that the series resistances 514a are not present. Resistances 514a, however, are included for the purpose which will later be explained. In operation the switch for each given ladder position is connected to the reference voltage if the bit in the corresponding register is 1, and to ground if the bit is 0.

The output of the ladder network 514 is applied by way of conductor 515 to a second digital-to-analog unit including switch unit 516 which controls a ladder network 517 and which in turn is controlled by a counter 518. A second counter 519 counts in parallel with counter 518. A decoding logic network 520 is connected to counter 519. Counters 518 and 519 are controlled by a clock 521 which is connected thereto by way of an AND gate 522 and line 527. A control multivibrator 523 controls one input of the AND gate 522. The decoding logic network 520 has output lines $i$ to $n$ with output lines $n$ being connected by way of line 524 to the reset terminal of the multivibrator 523.

A starting unit 525 is connected to the start terminal of the multivibrator 523. The starting unit 525 is also connected to the reset terminal of counter 519 and, by way of an AND gate 526, to the reset terminal of the counter 518.

One control terminal of the OR gate 526 is connected to the output of a comparator 533 which is connected at one input to the output line 529 of the ladder network 517 and at the other input to a comparison reference voltage source 530.

The line 529 is also connected to a bus 531 at the input of a plurality of sample-and-hold units $532i$–$532n$. Line 529 is connected by way of an inverting unit 540 to a bus 541 to sample-and-hold units $542i$–$542n$.

The voltages appearing at the outputs of the sample-and-hold units $532i$–$532n$ and $542i$–$542n$ are the voltages necessary to shift the beam from antenna unit 12 through a horizontal angle represented by the reference voltage from the numerical input unit 510c.

In a similar manner, a vertical control voltage generator 550 provides output voltages to sample-and-hold units $552i$–$552n$ and $562i$–$562n$ for shifting the beam from the antenna unit 12 through a vertical angle representative of the magnitude of the reference voltage applied from the reference numerical input voltage source 550c. The voltages from the sample-and-hold units may then be combined for application to the reference input terminals of each module (terminal 35 of FIGURE 4), so that each module in the antenna unit will be adjusted to shift the phase of the RF antenna excitation pulse in dependence upon the sum of the vertical and horizontal beam angles represented by the voltage on units 510c and 550c. The voltages may be combined from the sample-and-hold units in the manner known in the art, and such as described in "Introduction to Radar Systems," Skolnik, McGraw-Hill (1962), p. 312 et seq.

In operation, where a scanning sequence of the antenna is desired, the numbers to be read into the units 510 and 550 from the control sources 510c and 550c come from sequence generators or programmers. The units 510c and 550c may comprise part of a computer if the antenna is to be pointed at some target, as would be the case in a target tracking operation. In either case the voltage output on line 529 will then be proportional to the phase shift desired in the extreme or edge columns of the antenna.

As soon as the phase shift number or signal has been read into the unit 510, a start pulse is applied to the control flip-flop 523. This pulse also resets the counters 518 and 519. As soon as the control unit 523 is set, the AND gate 522 changes state to allow the clock pulse train to pass to the counters 518 and 519. This causes the two counters to advance together. The counter 518 controls the units 516 and 517, with the reference input voltage being the voltage on line 515. As the count in the counter 518 increases, the voltage on line 529 increases in uniform steps.

In the explanation of operation of the reference generator which follows, it will first be assumed that the total phase shift across the face of the antenna is to be less than 360°. Thereafter, operation for a phase shift greater than 360° will be explained.

For a phase shift less than 360°, counter 519 will count in synchronism with counter 518. The state of counter 519 is decoded to provide $n$ indications on $n$ individual output lines $520i$–$520n$. The output voltage on line 529 for each step of counters 518 and 519 is a voltage proportional to the phase shift for each column. That is to say, the first stage of counters 518 and 519 results in a voltage proportional to the phase shift for columns $+i$ and $-i$ of FIGURE 23. The second stage of counters 518 and 519 results in a voltage for columns $+ii$ and $-ii$, and so on. It will be noted from FIGURE 22 that the phase required for column $n$ is the negative of the phase required for column $-n$.

Counters 518 and 519 initially are reset to a state of all zeros. This results in a ladder output voltage on line 529 of zero volts for the first state of the counters. If the number of columns in the antenna is an even number, as shown in FIGURES 1 and 23, a reference of zero volts would result in the phase shift introduced in columns $i$ and $-i$ always being zero. This would induce a slight discontinuity in the phase slope across the antenna. To prevent this, the ladder network 514 is provided with resistors 514a. These resistors offset the output of the ladder 514 by an amount equal to one-half step of the output voltage.

The lines $520i$–$520n$, connected to the sample-and-hold units $532i$–$532n$, are sequentially energized to cause storage of a sample voltage in each of the units as the states of the output lines leading from decoder 520 change. Similarly, the other half of the antenna is provided with reference voltages from bus 541 by way of inverter unit 540.

When the output on line 529 equals the reference voltage from source 530, as applied to the comparator 533, the counter 518 is reset. Decoder 520 serves to reset flip-flop 523 but only at the end of a phase control sequence thus inhibiting clock pulses to counter 519. Counter 519 is reset by the next start pulse. The voltage from reference source 530 is set at a value corresponding with just less than the voltage on line 529 required for 360° phase shift.

Thus far, it has been assumed that the total phase shift required is less than 360°. This generally is not the case and this fact is the basis for including the second counter 519. More particularly, with the output from the voltage ladder 517 fed to the comparator 533 and with the reference voltage from source 530 slightly less than the voltage necessary for a 360° phase shift, when the ladder output voltage exceeds the voltage from source 530, the counter 518 will be reset. However, with the clock pulse being applied thereto, counter 518 will repeat its cycle so long as the clock pulse train is present. In contrast, the counter 519 continues its count until the clock pulse train is stopped by disabling gate 522. In this way, the output of the ladder 517 always indicates a phase shift in the range of 0° to 360°. Counter 519 always contains the number of the columns in binary form for which the voltage being generated at that instant applies.

The sample-and-hold units may be of conventional construction involving closure of a switch in response to a given voltage state on a decoder output line, such as line $520i$. This charges a capacitor in the sample-and-hold unit $532i$ such that the voltage on the output line from unit $532i$ is equal to the input voltage on bus 531 at the instant of closure of the switch. With a high impedance output buffer-amplifier in the sample-and-hold units, the charge on the condenser will remain unchanged after the input switch is opened. Switches in the sample-and-hold units are controlled by the decoded state of counter 519, as above noted. State 1 of counter 519 closes the switch in the sample-and-hold units $532i$ and $542i$. Since the inverter 540 is employed to feed bus 541, the two voltages are thus stored as reference voltages for two phase shift units. When the counter 519 reaches its $n$th state, a voltage for each column is stored in the $2n$ sample-and-hold units. The decoded $n$th state of counter 519 also resets unit 523 and ends the process.

The controller 550 for the rows of antenna modules is identical to the controller 510 for the columns of antenna modules. If the rows and columns are the same in number, then the controllers are identical. If the rows and columns are not the same, then the controllers differ only in the number of states produced by the counter 519.

The phase shift reference voltage, for application to a given module, is produced by summing the voltages from two of the sample-and-hold units. This would be accomplished by means of a pair of summing resistances for each element, such as resistances 560 and 561. The output voltage from unit 552i would be separately summed with each of the output voltages from the sample-and-hold units 532i–532n and 542i–542n.

It is not necessary that the antenna be as shown in FIGURE 22. By omitting elements in the outer rows or columns, the configuration shown in FIGURE 1 may be formed. Entire rows or entire columns may be omitted, depending upon the particular application required. If only one column is employed or if only one row is employed, then either the unit 510 or the unit 550 would be employed to generate the phase control reference voltages.

TIME SEQUENCE

Figure 25:
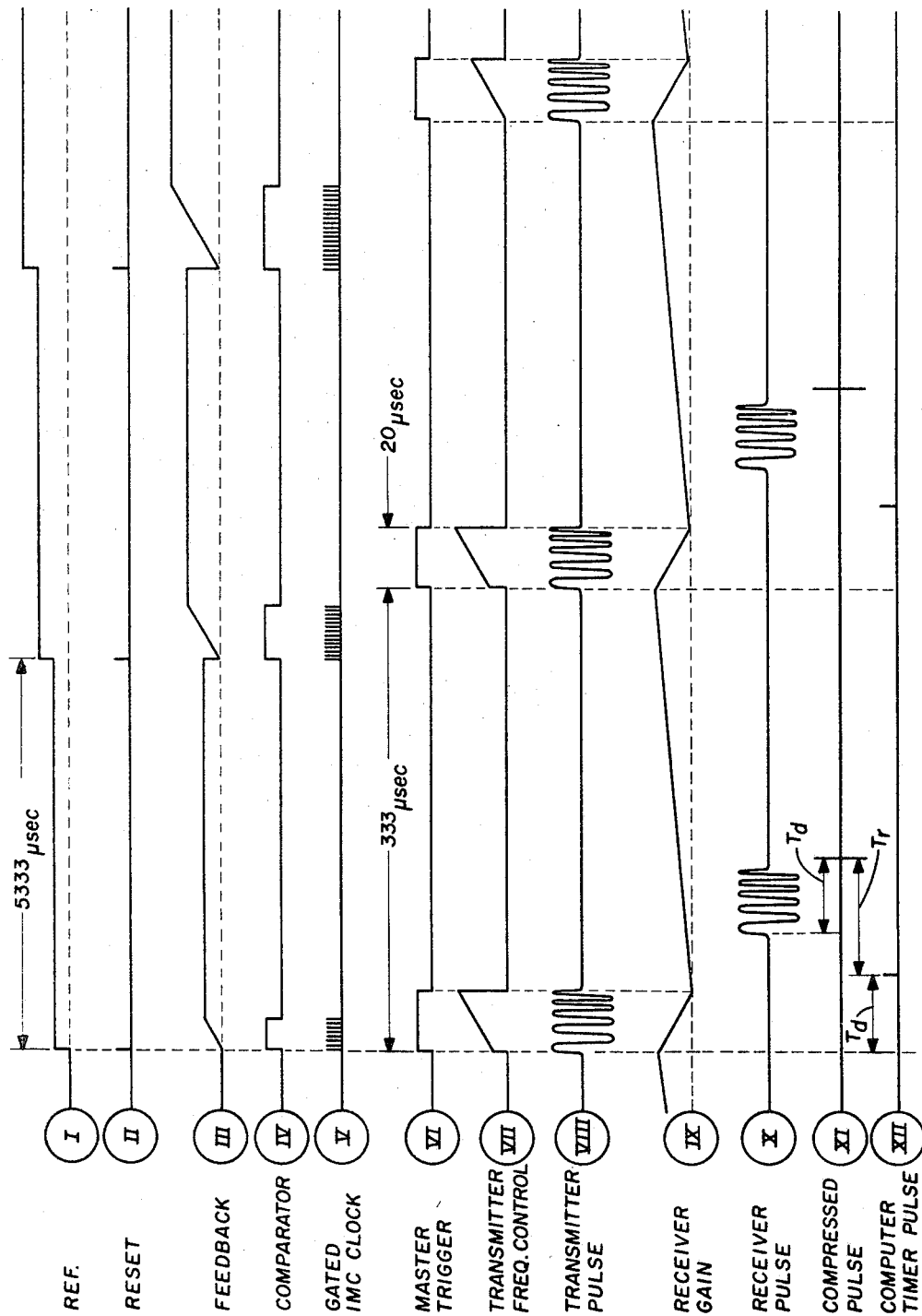
FIGURE 25 is a time plot of the sequence of operation of the radar of FIGURE 4.

In FIGURE 25 Time Graphs I–XII illustrate the operation of the system. Graphs I–V represent the operation of the delay line phase control network and Graphs VI–XII are system timing functions.

The voltage shown on Graph I represents the voltage at the input to the voltage comparator 143, namely the reference voltage applied to terminal 35. The voltage of Graph II is a reset pulse applied to the counters (not shown) to reset the circuits including switches SW1–SW6 to zero upon the appearance of a reference voltage at terminal 35 which is changed from any previous value.

The voltage on Graph III represents the voltage at the output of the converter 153 and applied to the voltage comparator 143. This voltage appears on line 154.

The wave form shown on Graph IV represents the output voltage appearing at the output of the voltage comparator 143. The voltage represented by Graph V represents the output pulses passing through the AND gate 142 and appearing on the input line 140 to the SW–1, which is the first stage in the 9-bit ripple-through phase shift counter.

In operation, when the phase shift counter is reset, the output voltage from the analog converter 153 drops back to zero and then as the delay lines are switched into the circuit by operation of the switches SW1–SW6, the voltage on line 154 builds up until it equals the value of the reference voltage on terminal 35 at which time the switching circuit ceases to change state by reason of the fact that the AND gate 142 is then disabled.

Graph VI illustrates the state of the transmit-receive switches. More particularly, the voltage of the master trigger on Graph VI is applied to the control input terminal of the multivibrator 163. The pulse 6a actuates a gate circuit so that transmit switches 163, 137 and 120 will be conductive and receive switches 164, 138 and 121 will be nonconductive. During the remainder of each TR cycle, the receive switches 164, 138 and 121 will be conductive.

Graph VII illustrates the variation in the frequency control voltage generated by the pulse compression generator 44 of FIGURE 3. The frequency control voltage is applied to the oscillator 41 to vary the frequency from a low frequency to a high frequency over a band of 1.25 mc. The resultant output of the oscillator 41 is illustrated by Graph VIII. The compression modulated pulse appears at the output of the power amplifier frequency modulated over a range of 1.25 mc. However, as the antenna excitation voltage pulse appears at the output of the frequency multiplier, the modulation range is 5 mc.

Graph IX represents the variation in the gain of the receivers 56 and 57 of FIGURE 3. The gain is controlled by the sensitivity time control unit 67, FIGURE 3. Thus, at the beginning of the listening interval, which is coincident with the onset of the transmitted pulse, the gain is gradually reduced, reaching a minimum level at a time coincident with the end of the transmitted pulse. The gain then is gradually increased as the radar range increases with time to a maximum value at the onset of the next transmitted pulse.

Graph X illustrates the received pulse delayed in time from the transmitted pulse. The received pulse is a compression modulated pulse appearing at the output of the IF amplifiers 56 and 57. The signal is then applied to the pulse compression filters 58 and 59, FIGURE 3, by which means the low frequencies are delayed a greater interval than the high frequencies so that the total energy of the received pulse is compressed, by a ratio of the order of 100 to 1, into a discrete pulse or energy bundle. Operation of a pulse compression filter generally speaking is characterized by a time delay $T_d$. Thus the computer timing pulse appearing on Graph XII is delayed by a like interval so that the radar range is represented by the time interval $T_r$.

The foregoing sequence is carried out for the selected values of the reference voltages applied to the input terminal 35 of FIGURE 4. Various programs may be followed to shift the beam from one direction to another at rates and in patterns which are dependent upon the requirements placed upon the system. It will be obvious that the template system above discussed may be used alternately with ground mapping programs and with air to air ranging programs by appropriate programming of the generator of FIGURE 22 which supplies the reference voltages.

The construction and operation of the array of modules 14 of FIGURES 1 and 2 as described herein is described and claimed in copending application Ser. No. 397,491, filed Sept. 18, 1964, of Harry F. Cooke, Tom M. Hyltin and Britton T. Vincent, Jr.

The surface-oriented diode illustrated in FIGURES 5–11 is described and claimed in copending application Ser. No. 397,479, filed Sept. 18, 1964, of Gerald Luecke.

The strip-line transmission line illustrated in FIGURES 6, 7 and 12 is described and claimed in copending application Ser. No. 397,492, filed Sept. 18, 1964, of James R. Biard.

The mixer circuit illustrated in FIGURES 5–12 is described and claimed in copending application Ser. No. 397,480, filed Sept. 18, 1964, of Tom M. Hyltin and Philip R. Thomas.

The antenna phase control logic illustrated in FIGURES 22–24 is described and claimed in copending application Ser. No. 397,472, filed Sept. 18, 1964, of Leo A. Chamberlain, Jr.

Circuit stabilization by the dual ground plane construction shown in FIGURE 12 is described and claimed in copending application Ser. No. 397,490, filed Sept. 18, 1964, of Philip R. Thomas.

Figure 26:
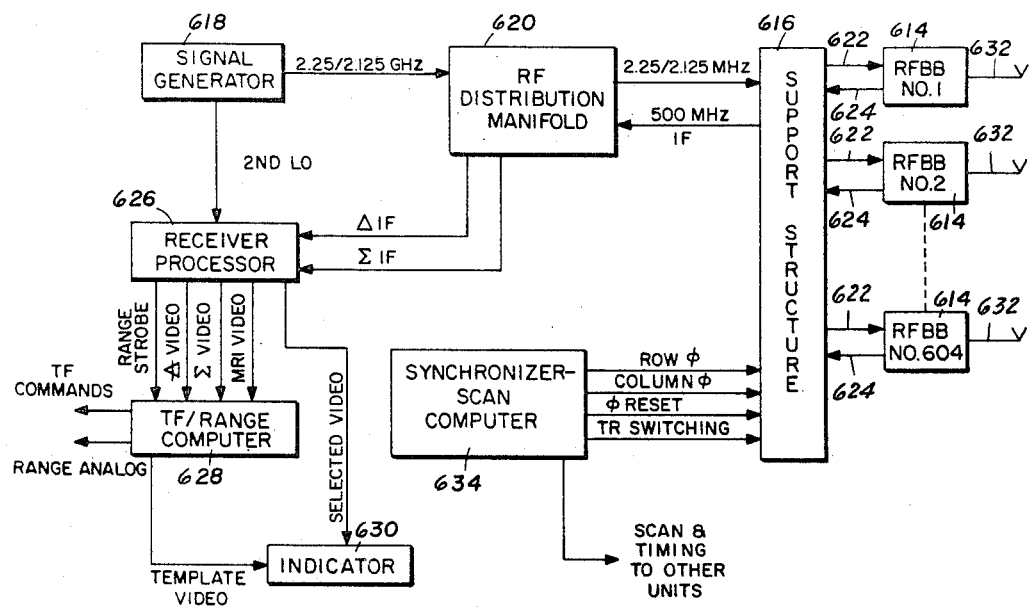
FIGURE 26 is a highly simplified block diagram of another design of a radar system in which the modules of the present invention may be used.

As another embodiment of the invention, reference is to FIGURE 26 whereby each of the modules 614 is adapted to be plugged into a support structure indicated by the reference numeral 616 in the schematic block diagram of FIGURE 26. A signal generator 618 produces an RF radar carrier signal centered about 2.25 gHz. for transmit, and a local oscillator signal centered about 2.125 gHz. These signals are applied to a distribution manifold 620 which distributes the energy in a predetermined manner to achieve beam shaping to each of the modules 614. This is achieved by a single coaxial channel 622 for each module.

Each module 614 has a single coaxial output 624 which is connected to the distribution manifold and carries a 500 MHz. IF signal. The distribution manifold 620 then supplies the summed IF signals via two channels to a receiver processor 626 which provides the various video information to a terrain following range computer 628 and to an indicator 630.

Each module 614 has a radiating antenna element 632 which transmits and receives RF energy at 9 gHz. as will hereafter be described in greater detail. The beam transmitted from the array of antenna elements 632 may be scanned both vertically and horizontally as desired by controlling the relative phase of the RF energy radiated from the respective rows and columns of antennas 632. Each module 614 includes a phase shift network operated by a binary counter for shifting the phase relationship of the transmitted RF carrier and the local oscillator so that a beam of microwave energy may be radiated in the desired direction and the direction of any returning echoes determined. A synchronizer and scan computer 634 operates the phase shift networks of the various modules in the manner necessary to achieve the desired scanning, and also provides the transmit and receive cycle control pulses. These signals are at sufficiently low frequencies to be treated essentially as D.C. signals and therefore requires no coaxial transmission line connections with the individual modules.

Figure 27:
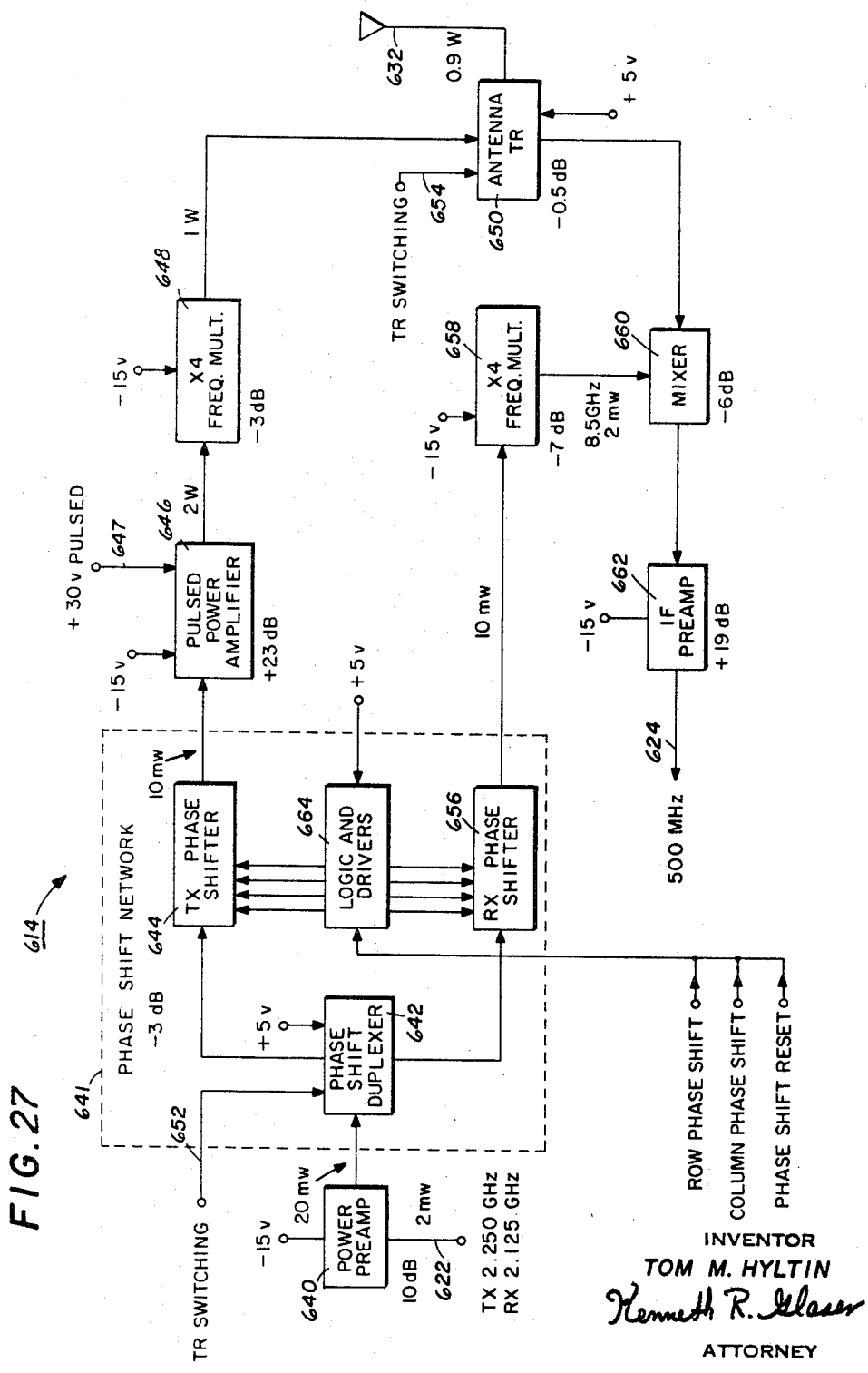
FIGURE 27 is a block diagram of a module in accordance with another embodiment of the present invention.

Referring now to FIGURE 27, each of the modules 614 is comprised of a power preamplifier 640 which receives the 2.25 gHz. signal during the transmit cycle and the 2.125 gHz. signal during the receive cycle. These signals are applied to a duplexer 642 in the phase shift network 641 which routes the 2.25 gHz. signal through a transmit phase shifter 644. The phase shifter 644 shifts the phase of the 2.25 gHz. signal in accordance with the position of the module in the array and the angle of the beam being transmitted by the overall antenna unit. The 2.25 gHz. signal is then applied to the input of a pulsed amplifier 646. The output of amplifier 646 is coupled through a frequency quadrupler 648 and an antenna TR switch 650 to the antenna element 632.

The transmit cycle is defined by the presence of a +30 volt pulse on input 647 to the amplifier 646, input 652 to the phase shift duplexer 642, and input 654 to the antenna TR switch 650. The absence of the +30 v. pulse defines the receive cycle.

During the receive cycle, the 2.125 gHz. signal on input 622 is fed through the power preamplifier 640, and is switched by phase shift duplexer 642 through the local oscillator channel including a receive phase shifter 656 and a second frequency quadrupler 658 to produce an 8.5 gHz. local oscillator injection voltage for a mixer 660. During the receive cycle, RF signals developed on antenna 632 are directed by the antenna TR switch 650 to the mixer 660. The difference of the RF signal and the local oscillator signal is then applied to the IF preamplifier 662 which produces a 500 MHz. IF signal at output 624.

As previously mentioned, phase shifter 644 introduces a phase shift to the transmitted RF signal that is related to the position of the antenna 632 of the particular module in the overall array and the scan angle of the beam. The angle from which the returning echoes are received is determined by the phase angle of the local oscillator signal applied to the mixer 660. If the phase shift of the transmitting signal is $\phi$, then the phase shift of the local oscillator signal must be $(360°-\phi+k)$ where $k$ is any constant phase angle. Since both the 2.25 gHz. and the 2.125 gHz. signals are multiplied by four, the phase shift introduced by the transmit cycle phase shifter 44 is $\phi/4$ and the phase shift introduced by the receive cycle phase shifter 56 is $(90°-\phi/4+k/4)$ where $k/4$ is a constant angle of $-5.6°$ as will hereafter be more fully described. Both phase shifters 644 and 656 are operated by the same logic circuit 664 which is incorporated in the module. The logic circuit may comprise a binary counter which drives the transmit phase shifter 644 with the true outputs and the receive phase shifter with the complement outputs to achieve the necessary phase relationship between the two signals.

The input 2.25 gHz. and 2.125 gHz. signals may be preprocessed in substantially any conventional manner to enable or enhance the subsequent processing of the IF signal.

Figure 28:
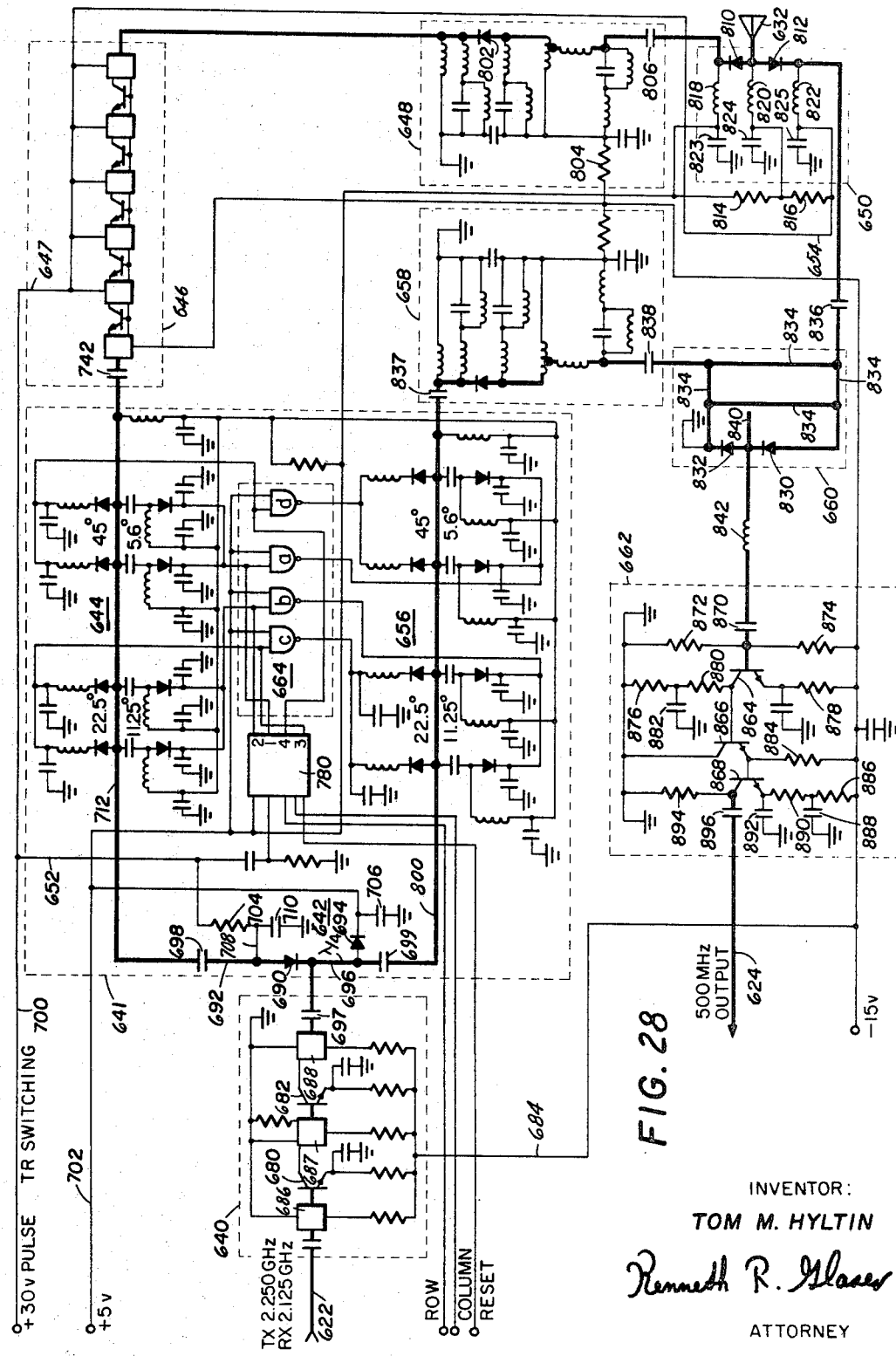
FIGURE 28 is a detailed schematic circuit diagram of the module of FIGURE 27.

The module 614 is shown in greater detail in the circuit diagram of FIGURE 28. The power preamplifier 640 may comprise two transistor amplifier stages 680 and 682 with the necessary biasing resistors connecting the circuit to ground and to a $-15$ v. D.C. power supply 684. Impedance transforming means 686, 687 and 688 are provided at the input and output of each of the amplifier stages, and may comprise any suitable conventional circuit means such as transformers formed by strip transmission lines. The amplifier circuit 640 may be in hybrid form wherein the circuit is fabricated on a ceramic substrate backed by a ground plane. The resistors, inductors, transformers and capacitors are formed by metal films on the surface of the substrate, and the individual, unpackaged transisors 680 and 682 alloyed in place on the strip transmission lines to complete the circuit.

The phase shift duplexer switch 642 is comprised of a diode 690 connected in series in the transmit channel 692 and a diode 694 connected in shunt with the receive channel 696. Bypass capacitors 697, 698 and 699 provide D.C. isolation for the diodes 690 and 694. The diodes 690 and 694 are biased through the D.C. circuit extending from the $+5.0$ v. D.C. input 702, diode 694, diode 690, resistor 704, and TR switching input 652. Thus, when the +30 volt pulse is applied to input 700, diode 690 and diode 694 are forward biased "on." When both diodes 690 and 694 are turned "on," the diode 694 and the bypass capacitor 706 provide an RF short to ground and the quarter wavelength section of the receive path 696 reflects an open circuit to the junction of the switch. The incoming 2.250 gHz. signal is therefore directed through diode 690, which is "on," to the transmit path 692. The quarter wavelength section 708 and the bypass capacitor 710 reflect an RF short to the transmit line 692 so as not to interfere with the transmission of the 2.250 gHz. signal. On the other hand, in the absence of the +30 volt pulse on input 700, diodes 690 and 694 are reverse biased "off." The very high impedance of diode 690 blocks energy from the transmit path 692, and diode 694 provides a very high impedance in the shunt path, so that the 2.125 gHz. energy is directed through the receive path without interference.

The transmit line 692 is coupled by a D.C. isolation capacitor 698 to a strip transmission line 712 which extends through a four bit digital phase shifter 644. The phase shifter 644 is shown in the enlarged view of FIGURE 29 and is comprised of 45°, 22.5°, 11.25° and 5.6° bits. The 22.5° bit is comprised of a first shunt path including a diode 714 and an inductor 716 which is coupled to ground by a bypass capacitor 718, and a second shunt path including diode 715, inductor 717 and bypass capacitor 719. The length of line 712a between the shunt paths of the diodes 714 and 715 is approximately one quarter wavelength. The 11.25° bit is also connected across the quarter wavelength section 712a, and is comprised of a first shunt path including a capacitor 720, inductor 756 and bypass capacitor 758. Diode 722 and bypass capacitor 724 shunt inductance 756 when the diode is turned "on." The 11.25° bit also includes a second identical shunt network including a capacitor 721, inductor 757, bypass capacitor 759, diode 723 and bypass capacitor 725. The 45° bit is comprised of a first shunt path including diode 728, inductor 730, and bypass capacitor 732, and a second shunt path comprised of diode 729, inductor 731, and bypass capacitor 733. The section 712b by line 712 between diodes 728 and 729 is also about one quarter wavelength. The 5.6° bit is also connected across the quarter wavelength section 712b and is comprised of a first shunt network including capacitor 736, inductor 752, bypass capacitor 753, diode 738, and bypass capacitor 740, and a second identical shunt network including capacitor 737, inductor 754, bypass capacitor 755, diode 739, and bypass capacitor 741.

The transmission line 712 between coupling capacitor 698 and coupling capacitor 742 is biased to about +1.0 volt from the +5.0 volt D.C. supply source at terminal 670 through a resistor 744 and a quarter wavelength choke 746. A bypass capacitor 748 couples the end of choke 746 to ground so that an RF open circuit is reflected to the junction between the choke 746 and the transmission line 712.

Diodes 714 and 715 of the 22.5° phase shift bit are forward biased "on" when logic input #3 is at a logic "0" level of about +0.2 volt, and are reverse biased "off" when logic input #3 is at a logic "1" level of about +4.0 volts. Similarly, diodes 728 and 729 are forward biased "on" when logic input #4 is at a logic "0" level, and are reverse biased "off" when input #4 is at a logic "1" level.

Diodes 738 and 739 of the 5.6° bit are forward biased "on" when logic input #1 is at a logic "0" level of +0.2 volt because conductor 750 is at about +1.0 volt level. This is achieved through the D.C. circuit extending from conductor 750 through inductors 752 and 754 and the diodes to logic input #1. Diodes 738 and 739 are reverse biased "off" when logic input #1 is at a logic "1" level of +4.0 volts. Bypass capacitors 753 and 755 isolate the D.C. bias voltage from the RF portion of the network. Similarly, diodes 722 and 723 of the 11.25° bit may be forward biased by current from conductor 678 through inductors 756 and 757 and the respective diodes to logic input #2 when the logic input #2 is at a logic "0" level, and are reverse biased "off" when logic input #2 is at the logic "1" level. Again, bypass capacitors 758 and 759 RF couple the inductors 684 and 685 to ground so that the D.C. voltage can be injected to bias the diodes 650 and 651 without interfering with the RF operation of the circuit.

The eight diodes of the phase shift network 630 are preferably PIN diodes which under reverse bias assume a relatively constant capacitive reactance due to the fact that the depletion layer extends between heavily doped p-type and n-type regions, thereby establishing a truly intrinsic region of substantially constant width.

The operation of the 45° bit is illustrated in FIGURE 30a. The normal phase shift resulting at the end of a quarter wavelength of transmission line, such as transmission line 712b is represented by the phase vector 762 at 90°. When the diode 728 is turned "on," however, the shunt path including inductor 730 and bypass capacitor 732 has an inductive reactance (because diode 728 acts merely as a resistance), and the phase delay at the end of the quarter wavelength of line 712b is actually that represented by the phase vector 764. By properly selecting the value of the inductance 730, the angle between the 90° vector and vector 764 can be made to be 22.5°. When diode 728 is turned "off" and becomes a capacitance, however, the shunt circuit has a net capacitive reactance resulting in a phase shift represented by the vector 766. By properly selecting the reverse bias capacitance of diode 728, the vector 766 may be disposed 22.5° from the 90° vector. As a result, the phase delay at the end of the quarter wavelength section 712b may be switched through a 45° angle merely by switching diode 656 "off."

The shunt path including diode 729, inductor 731 and bypass capacitor 733 is provided merely to reduce insertion loss by minimizing the voltage standing wave ratio. Thus, it will be noted that when logic input #4 is at a logic "1" level, the 45° phase bit is effectively switched into the circuit so that the signal propagating through strip transmission line 712 will be delayed by 45° when compared to the delay in the same signal when input #4 is at a logic "0" and the diodes are forward biased "on."

The 22.5° bit operates in precisely the same manner as the 45° bit, except that the capacitive values of the diodes 714 and 715 and the inductance values of inductors 716 and 717 are selected so as to result in a total 22.5° shift as represented between the phase vectors 768 and 770 in FIGURE 30b.

The 11.25° phase bit and the 5.6° phase bit, however, operate on a different principle. When the diode 722, for example, is biased "on" by a logic "0" level on input #2, the RF path is essentially through capacitor 720, diode 722, and bypass capacitor 724 because inductor 756 is shunted by the diode. The shunt network then has a relatively high capacitive reactance which results in a phase shift represented by phase vector 769 in FIGURE 30c. Then when input #2 goes to a logic "1" level, diode 722 is biased "off." Then the RF path is through capacitor 720, inductor 756 and bypass capacitor 758. This reduces the net capacitive reactance of the shunt network, resulting in a phase shift represented by phase vector 771. By properly selecting the values of the capacitor 720 and inductor 756, the phase shift angle between vectors 769 and 771 can be 11.25°. The 5.6° phase bit operates in the same manner, except that the values of the capacitor 736 and inductor 752 are chosen to achieve a 5.6° phase shift as represented by phase vectors in FIGURE 30d.

The use of the shunt network illustrated for the lower value bits is necessitated because the diodes suitable for use at the higher operating frequencies do not have a sufficiently large capacitance to achieve the relatively small phase shift angle necessary to operate symmetrically about the 90° phase vector. Thus, the 11.25° and 5.6° bits are operated wholly within the capacitive reactance quadrant.

It will be noted that the shunt circuit controlled by diode 714 and the shunt circuit controlled by diode 722 are connected in series from the same point on line 712. Accordingly, the values of these circuits must be chosen so that the composite effect of the two parallel shunt circuits will achieve the desired phase shift for each of the four possible combinations of states of the switching diodes 714 and 722. Similarly, the values of the shunt circuits including diodes 715 and 721, diodes 728 and 738, and diodes 727 and 737 all must be chosen while taking into consideration the various combinations possible in the operation of the system. These values can be selected, however, using conventional circuit analysis equations known in the art.

The phase shift network 656 is identical to the phase shift network 644. Both phase shift network 644 and phase shift network 656 are operated by the same logic circuit 664. The logic circuit 664 may comprise a conventional four bit binary counter 780 having logic outputs #1–#4 as indiacted. It will be noted that outputs #1–#4 of the binary counter 780 are connected to logic inputs #1–#4 which control the 5.6°, 11.25°, 22.5° and 45° bits, respectively, of the phase shift network 644. Also, the four outputs #1–#4 of counter 180 are connected through NAND gates a–d, respectively, which control the 5.6°, 11.25°, 22.5° and 45° bits, respectively, of phase shift circuit 656. Each of the NAND gates a–d is continuously enabled by a logic "1" level derived directly from the +5.0 volt input 702, so that the NAND gates act merely as inverters of the logic level at the outputs #1–#4 of the counter 780.

The counter 780 is connected to count in the manner illustrated by the truth table of FIGURE 31. As a result, the phase introduced in the 2.250 gHz. signal through conductor 112 during the transmit cycle progresses from 0° to 84.35°, incrementing essentially in 5.6° for each count of the counter. On the other hand, the phase of the 2.125 gHz. signal during the receive cycle on path 800 through phase shifter 656 is progressively reduced from 84.35° to 0°, essentially in 5.6° increments. Thus, if the phase shift during the receive cycle is 90°−4+k/4 where k/4 is the constant value of about −5.6°, which is essentially the value of the least increment of each of the phase shift networks. Since the frequencies of each of the signals is subsequently multiplied by four, the phase angle of the transmitted energy is 0 and the phase of the local oscillator injection voltage is 360°.

The output from the transmit phase shifter 644 is coupled through the capacitor 742 to the input of the power amplifier 646. The power amplifier 646 is continually provided with a −15.0 volt power supply, and is intermittently provided with the +30.0 volt power supply from input 700 and is thus operative only during the transmit cycle defined by the +30.0 volt pulse on input 700. The power amplifier 646 may comprise either five or six transistor amplifier stages intercoupled by impedance transforming networks. The power amplifier may be in hybrid circuit form on a ceramic substrate backed by a metallized ground plane. The impedance matching networks may then be formed by strip transmission lines, resistors and capacitors fabricated on the top surface of the ceramic substrate using metallic and insulating films. Unpackaged transistor chips can be mounted directly on the substrate by alloying in the conventional manner to produce a hybrid circuit.

The frequency quadruplers 648 and 658 may be of the same circuit design as illustrated. The frequency multiplier 648, for example, includes a varactor diode 802 which is reverse biased by the D.C. circuit extending between ground and the −15.0 volt supply through the various parallel inductor paths and resistor 804. The multiplier includes the resonating filters and impedance transforming sections necessary to multiply the 2.250 gHz. signal at the input by four and produce a 9 gHz. signal at the output which is coupled through bypass capacitor 806 to the TR switch 650.

The TR switch 650 may be fabricated as a monolithic circuit using a single crystal high resistivity silicon substrate as described in copending U.S. patent application, Ser. No. 606,201, entitled "Monolithic Microwave Duplexer Switch" filed on behalf of Alfred Ertel by the assignee of the present invention. Thus, the TR switch 650 may be formed on a monocrystalline high resistivity silicon substrate having a metallized ground plane over the back surface of the substrate that is D.C. isolated from the substrate by a silicon dioxide insulating layer. A pair of PIN switching diodes 810 and 812 are formed in the top surface of the silicon substrate. The switching T in which the diodes are connected is formed by strip transmission lines in which the silicon acts as the dielectric. The +5.0 volt supply from input 702 is connected to one end of a voltage divider formed by resistors 814 and 816. The TR switching line 654 from the +30.0 volt pulse input 700 is connected to the other end of the voltage divider. The +5.0 volt end of the voltage divider is connected through a quarter wavelength choke 818 to one terminal of diode 810, the center tap of the voltage divider is connected through quarter wavelength choke 820 to the junction between the switching diodes, and the 30.0 volt end of the voltage divider is connected by quarter wavelength choke 822 to the other terminal of diode 812. Capacitors 823, 824 and 825 produce RF short circuits which are reflected as open circuits to the RF signal path by the respective quarter wavelength chokes. Thus, during the +30.0 volt pulse which defines the transmit cycle, diode 810 to forward biased "on" to connect the output of frequency multiplier 648 to the antenna 632, and diode 812 is reverse biased "off" to isolate the antenna 632 from the mixer 660. In the absence of the +30.0 volt pulse, which defines the receive cycle, diode 810 is reverse biased "off" to isolate the antenna from the frequency multiplier 648, and diode 812 is forward biased "on" to connect the antenna 632 to one input of the mixer 660 by way of coupling capacitor 836.

As mentioned, frequency multiplier 658 may be identical to multiplier 648 and transforms the 2.125 gHz. signal coupled through capacitor 837 to an 8.5 gHz. signal which is coupled by capacitor 838 to an input of mixer 660. The mixer 660 may be fabricated in hybrid circuit form. A coupler comprised of the strip line network 834 divides both the energy from the antenna 632 and from the multiplier 658 equally between Schottky barrier mixer diodes 830 and 832. An open ended quarter wavelength stub 840, tuned to 9 gHz., limits the output of the mixer to the difference frequency of 500 MHz. The mixer 660 may be formed on a ceramic substrate backed by a metallized ground plane so that the metallized film strips forming the coupling network and the stub 840 have transmission line properties for the high frequency signals. The diodes 830 and 832 may be unpackaged, silicon or GaAs Schottky barrier diodes mounted on the ceramic substrate and connected in the strip lines by alloying.

An inductor 842 is used to couple the output of the mixer 660 to the input of the IF preamplifier 662 in order to improve the noise figure of the amplifier. A number of different types of amplifiers have been built which will operate satisfactorily at 500 MHz. However, the amplifier 662 disclosed in FIGURE 28 is a video type amplifier which utilizes no inductors or strip transmission lines. The amplifier 662 is fabricated in monolithic integrated circuit form on a slice of single crystal, high resistivity silicon. The three transistors 864, 866 and 868 are fabricated in low resistivity silicon suitable for use in transistor fabrication which is epitaxially grown in pockets of the high resistivity silicon substrate. The resistors and capacitors are formed by metallized conductive films and sputtered silicon dioxide insulating films on the surface of the substrate. The input capacitor 870 provides D.C. isolation. Resistors 872 and 874 provide a bias level for the base of input transistor 864. Resistors 876 and 878 establish the bias for the collector and emitter of transistor 864, and resistor 880 provides the load resistor for the first amplifier stage since bypass capacitor 882 couples the high frequency signals to ground. Resistor 884 is the load resistor for the emitter-follower stage which provides power gain and increases the impedance level and therefore the gain of the first stage. The increased impedance also isolates the noise figure in the input stage. Resistor 886 is the emitter bias resistor, capacitor 888 is a bypass capacitor, and the network formed by resistor 890 and capacitor 892 provides high frequency shaping of the output signal. Resistor 894 is the load resistor for the output. Capacitor 896 merely provides D.C. isolation and couples the output of the last amplifier stage 868 to the output 624 of the module 614.

Typical operating levels of the module 14 are illustrated in FIGURE 27. The power preamplifier 640 has a 10 db gain and increases the 2.25 gHz. and 2.125 gHz. signals from about two milliwatt level to about the twenty milliwatt level. The phase shift network 641 results in a 3 db loss in both the transmit and the receive paths. The pulsed power amplifier 646 has a 23 db gain to convert the ten milliwatts of input power to two watts of output power. The frequency quadrupler 648 has a 3 db loss, resulting in about one watt being applied to the antenna TR switch 650. As a result of about a 0.5 db loss in the antenna switch 650, about 0.9 watt is applied to the antenna 632. The ten milliwatt energy from the receiver phase shifter 656 is attenuated by about 7 db in the frequency multiplier 658, so that the injection voltage to the mixer 660 is at about two milliwatts. The mixer 660 results in a 6 db loss, and the IF preamplifier 662 has about a 19 db gain.

Although preferred embodiments of the invention have been described in detail, it is to be understood that various changes, substitutions and alterations can be made therein without departing from the spirit and scope of the invention as defined by the appended claims.

What is claimed is:

1. A module for incorporation in a phased array antenna of the type having an array of said modules, each said module comprising:
   (a) radiation structure for transmitting and receiving electromagnetic energy,
   (b) phase shift means for shifting the phase of a transmitted signal at a first phase angle and a received signal, at a second phase angle related to said first phase angle, (c) power amplification means for increasing the power of said transmitted signal, (d) a transmit channel coupling said phase shift means and said power amplification means to said radiation structure, thereby to convey said phase shifted transmitted signal of increased power to said radiation structure and excite said radiation structure to produce electromagnetic enegry representative of said phase shifted transmitted signal of increased power, and (e) a receive channel coupled to said phase shift means and said radiation structure for conveying a received signal representative of received electromagnetic energy.

2. A module according to claim 1, wherein said phase shift means comprises first and second phase shifters, said transmit channel coupling said phase shifter and said power amplification means to said radiating structure and said receive channel coupling said second phase shifter and said radiation structure.

3. A module according to claim 1, wherein said phase shift means comprises a plurality of delay lines in said transmit and receive channels.

4. In a system for transmitting and receiving electromagnetic energy, a pulsed RF carrier source, phase shift control means, transmit-receive control means, a phased array antenna including a plurality of antenna modules; each such module including: phase shift means, first transmit-receive switching means, power amplifier means, second transmit-receive switching means, signal radiating means, and a received signal amplifying means, the transmitted signal for such system being coupled from said carrier source through the phase shift means and through the power amplifier to the radiating means in each module, the received signal for the system being coupled from the radiating means through the received signal amplifying means and the phase shift means in each module; the phase shift control means controlling the magnitude of the phase shift in the phase shift means in each module; the transmit-receive control means controlling the first and second transmit-receive switching means in each module to direct the coupling of said transmitted and received signals.

5. A module for incorporation in an array antenna for a radar system which comprises:

(a) radiation structure, (b) a transmit channel between an RF input terminal and the said radiation structure for pulsed excitation of the said radiation structure with a transmitted signal, said channel including a mixer and power amplifier connected in series, (c) a variable phase shift circuit connected between a phase control carrier terminal and the said mixer for controlling the phase of the transmitted signal pulses applied to the said radiation structure, and (d) a receiving channel leading from said radiation structure and through the said phase shift circuit to an output terminal for conveying received signals from said radiation structure to said output terminal.

6. The combination set forth in claim 5 in which a separate phase control reference source is connected to said phase shift circuit to control the phase of the RF pulses applied to said radiation structure.

7. A module including radiation structure for incorporation as an element in a phased array antenna for a radar system which comprises:

(a) radiation structure (b) a transmitting channel comprising,
  (i) an input signal terminal,
  (ii) a first mixer connected to the said input signal terminal,
  (iii) a power amplifier connected to the output of the mixer for enhancing the power of an RF signal to a level in excess of the power desired to excite said radiation structure,
  (iv) a frequency multiplier connected to the output of the power amplifier for increasing the frequency of said RF signal by a predetermined factor, and
  (v) a first TR switch connecting the output of the frequency multiplier to said radiation structure, (c) a phase control channel comprising,
  (i) another input terminal for production of a phase control carrier signal at a first frequency,
  (ii) a second TR switch connecting the phase control carrier input terminal to a variable line length switching circuit including a plurality of delay lines of increasing lengths, and control means responsive to a control signal for switching the delay lines into the circuit to vary the phase of the said phase control carrier signal in accordance with variations in the control signal, and
  (iii) a third TR switch connecting the output of the variable line length switching circuit to the first mixer for modulating the phase of the said input signal in accordance with the phase of the phase control carrier, thereby to produce said RF, signal, (d) a receiver channel comprising,
  (i) a mixer detector having one input connected to the radiation structure by the first TR switch and the other input connected to a local oscillator terminal for producing an IF signal at a frequency equal to the frequency of the phase control carrier signal multiplied by the factor of the frequency multiplier, the output of which is connected by the second TR switch to the output of the variable line length switching circuit, and
  (ii) an IF output terminal connected to the input terminal of the variable line length switching circuit by the first TR switch, and (e) control means connected to the three TR switches for first enabling the transmitting channel and phase control channel while disabling the receiver channel, then enabling the receiver channel while disabling the transmitting channel.

8. The combination defined in claim 7 in which the variable line length switching circuit comprises:

(a) a plurality of strip-line conductors of digitally-increasing lengths, (b) a series of diode switching means for alternatively connecting each of the conductors to provide a digi-connecting each of the conductors in a series circuit or shunting the conductors to provide a digitally-variable length strip line, (c) a flip-flop connected to operate each diode switching means, (d) control circuit means for actuating the flip-flops sequentially in response to a clock pulse signal to provide a digitally-increasing effective line length, (e) converter means connected to the strip line for producing a feedback signal proportional to the effective line length, (f) a comparator connected to the output of the converter means for comparing said feedback signal to a reference input signal related to the desired phase angle and for producing an output signal when the reference input signal exceeds the feedback signal by a predetermined amount, and (g) an AND gate connected at its output to the input of the flip-flop and connected at its inputs to the output of the comparator and to a clock pulse terminal for passing clock pulses only when the comparator produces its output signal.

9. In a radar system, the combination of:

(a) a signal generator for producing an RF carrier signal during a transmit cycle and a local oscillator signal during a receive cycle at an output,
(b) a plurality of transmit-receive modules each having an antenna disposed in a phased array antenna pattern, an RF input, a transmit circuit including a first phase shifter, a receiver circuit including a second phase shifter and a mixer, a first duplexer switch for connecting the RF input to the transmit circuit during the transmit cycle and to the mixer during the receive cycle, a second duplexer switch for connecting the transmit circuit to the antenna during the transmit cycle and the antenna to the mixer during the receive cycle, and an IF output connected to the output of the mixer,
(c) an IF signal processing circuit,
(d) a manifold connecting the output of the signal generator to the RF input of each of the modules and the IF output of each module to the IF signal processing circuit, and
(e) scan control means for controlling the first and second phase shifters of the respective modules in accordance with the position of the antenna of the module in the array and the scan angle of the beam from the array of antennas.

10. The combination defined in claim 9 wherein: the transmit circuit includes the first phase shifter, a power amplifier coupled to the output of said first phase shifter and a first frequency multiplier coupled to the output of said power amplifier, and the receive circuit includes the second phase shifter and a second frequency multiplier coupled to the output of said second phase shifter for producing the local oscillator signal applied to the mixer.

11. The combination defined in claim 10 further characterized by:
(a) a power preamplifier connected between the RF input of each module and the first duplexer switch, and
(b) an IF preamplifier connected between the output of the mixer and the IF output of each module.

12. The combination defined in claim 9 wherein: the first phase shifter produces a phase delay in the RF signal as transmitted from the antenna of $\phi$ related to the position of the module in the array and the scan angle of the beam, and the second phase shifter produces a phase delay in the local oscillator signal as applied to the mixer of $360° - \phi + k$ where $k$ is a constant phase angle.

13. The combination defined in claim 12 wherein:
(a) each of the first and second phase shifters is a binary phase shifter, and
(b) the scan control means includes a binary counter for each module, the true outputs of the binary counter being connected to control one of the phase shifters and the complement outputs being connected to control the other phase shifter.

14. A transmit-receive module for a radar system having a phased array antenna formed by a plurality of separate antennas, comprising the combination of: a transmit circuit for exciting an antenna in the array with an RF carrier signal the phase of which is shifted by the angle $\phi$ determined by the position of the antenna in the array and the scan angle of the beam from the array, a receive circuit including a mixer for mixing the signal received by an antenna and a local oscillator signal and means for shifting the phase of the local oscillator signal by the angle $(360° - \phi + k)$ where $k$ is a constant and the transmit circuit includes a first phase shifter, a power amplifier coupled to the output of said first phase shifter and a frequency multiplier coupled to the output of said power amplifier.

15. A transmit-receive module for a radar system having a phased array antenna formed by a plurality of separate antennas, comprising the combination of: a transmit circuit for exciting an antenna in the array with an RF carrier signal the phase of which is shifted by the angle $\phi$ determined by the position of the antenna in the array and the scan angle of the beam from the array, a receive circuit including a mixer for mixing the signal received by an antenna and a local oscillator signal and means for shifting the phase of the local oscillator signal by the angle $(360° - \phi + k)$ where $k$ is a constant, the transmit circuit also includes a first controllable binary phase shift network for shifting the phase of the RF carrier signal by the angle $\phi$, the means for shifting the phase of the local oscillator signal is a second controllable binary phase shifter, and further characterized by a binary counter the true outputs of which are connected to control one of the binary phase shifters and the complement outputs of which are connected to control the other binary phase shifter.

16. A transmit-receive module for a radar system having a phased array antenna, the module comprising the combination of:
(a) an antenna for disposition in the antenna array,
(b) an RF input for receiving an RF carrier signal during a transmit cycle and a local oscillator signal during a receive cycle,
(c) a transmit circuit including a first phase shifter,
(d) a receive circuit including a second phase shifter and a mixer,
(e) a first duplexer switch for connecting the RF input to the transmit circuit during the transmit cycle and to the second phase shifter of the receive circuit during the receive cycle, and
(f) a second duplexer switch for connecting the transmit circuit to the antenna during the transmit cycle and for connecting the antenna to the mixer, during the receive cycle.

17. The combination defined in claim 16 wherein: the transmit circuit includes the first phase shifter, a power amplifier coupled to the output of said first phase shifter and a first frequency multiplier coupled to the output of said power amplifier, and the receive circuit includes the second phase shifter and a second frequency multiplier coupled to the output of said second phase shifter for producing the local oscillator signal applied to the mixer, and an IF amplifier connecting the output of the mixer to an IF output for the module.

18. The combination defined in claim 17 wherein each of the frequency multipliers converts an S-band signal to an X-band signal.

19. The combination defined in claim 16 wherein:
(a) the first phase shifter produces a phase delay $\phi$ in the RF signal as transmitted from the antenna, and
(b) the second phase shifter produces a phase delay $360° - \phi + k$ in the local oscillator signal as applied to the mixer where $k$ is a constant phase angle.

20. The combination defined in claim 19 wherein:
(a) each of the first and second phase shifters is a binary phase shifter, and further characterized by
(b) a binary counter the tube outputs of which are connected to control one of the phase shifters and the complement outputs of which are connected to control the other phase shifter.

21. In a radar system having a phased array antenna formed by a plurality of separate antennas for phase scanning in orthogonal directions, comprising the combination of: a transmit circuit for exciting an antenna in said array, means for applying an RF carrier signal to said transmit circuit, said transmit circuit coupling said RF carrier signal to said antenna, means for phase shifting said RF carrier signal by an angle $\phi$ determined by the position of the antenna in the array and the scan angle of the beam from the array, a receive circuit coupled to the antenna, a local oscillator generating a single frequency local oscillator signal, means for applying a said single frequency local oscillator signal to said receive circuit, said receive circuit including a mixer coupled to said single frequency local oscillator signal for mixing the signal received by the antenna and said single frequency local oscillator signal to produce an IF output signal, and means for shifting the phase of said single frequency local oscillator signal by the angle $(360° - \phi + k)$ where $k$ is a constant.

22. The combination defined in 21 wherein: the receive circuit includes a frequency multiplier for multiplying the frequency of the local oscillator signal after the phase of the local oscillator signal has been shifted and before its application to the mixer.

23. The combination defined in claim 21 wherein said means for applying said RF carrier signal and said means for applying said single frequency local oscillator signal comprise a single input channel including a pre-amplifier and a duplex switch for connecting said input channel to said transmit circuit during a transmit cycle and to said receive circuit during a receive cycle.

References Cited
UNITED STATES PATENTS 3,083,360  3/1963  Wetty et al. _____ 343—5

RODNEY D. BENNETT, *Primary Examiner.*

C. L. WHITHAM, *Assistant Examiner.*